United States Patent
Uramachi et al.

(10) Patent No.: US 6,240,775 B1
(45) Date of Patent: Jun. 5, 2001

(54) FLOW RATE SENSOR

(75) Inventors: Hiroyuki Uramachi; Tomoya Yamakawa; Fumiyoshi Yonezawa; Shingo Hamada; Takeharu Oshima; Satoru Kotoh, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/179,444

(22) Filed: Oct. 27, 1998

(30) Foreign Application Priority Data

May 11, 1998 (JP) .................................. 10-127823

(51) Int. Cl.[7] .................................................. G01F 1/684
(52) U.S. Cl. .................... 73/204.21; 73/204.15; 73/202; 73/118.2
(58) Field of Search .................. 73/204.21, 204.15, 73/204.24, 204.25, 204.26, 202, 202.5, 118.2, 861.52, 861.63

(56) References Cited

U.S. PATENT DOCUMENTS

| | | | |
|---|---|---|---|
| 4,363,238 | * 12/1982 | William | 73/204.21 |
| 4,864,855 | * 9/1989 | Shiraishi et al. | 73/204.26 |
| 5,014,552 | * 5/1991 | Kamiunten et al. | 73/204.21 |
| 5,048,327 | * 9/1991 | Atwood | 73/204.21 |
| 5,081,866 | * 1/1992 | Ochiai et al. | 73/204.21 |
| 5,167,147 | * 12/1992 | Peters et al. | 73/204.21 |
| 5,329,812 | 7/1994 | Tada et al. | |

FOREIGN PATENT DOCUMENTS

| | | |
|---|---|---|
| 57-23818 | * 2/1982 | (JP) ................... 73/204.21 |
| 1-185416 | 7/1989 | (JP) . |
| 2-28520 | 1/1990 | (JP) . |
| 5-340778 | 12/1993 | (JP) . |
| 6-288805 | 10/1994 | (JP) . |
| 7-71985 | 3/1995 | (JP) . |
| 8-313318 | 11/1996 | (JP) . |

* cited by examiner

Primary Examiner—Harshad Patel
(74) Attorney, Agent, or Firm—Sughrue, Mion, Zinn, Macpeak & Seas, PLLC

(57) ABSTRACT

A flow rate sensor comprises: a main fluid passage for a fluid to flow therealong; a detecting pipe conduit coaxially disposed in the main fluid passage; a temperature sensing element for sensing the temperature of the fluid; a flow rate sensing element including a flow rate detecting resistance made of a thermo-sensitive electrically resistant material, the flow rate detecting element being disposed in the main fluid passage in a manner such that the flow rate detecting resistance is exposed to the fluid flowing therethrough; and a control circuit for controlling an electric current flowing to the flow rate detecting resistance such that the temperature of the flow rate detecting resistance may be maintained at a predetermined value which is higher to some extent than a fluid temperature detected by the temperature sensing element. The main fluid passage involves a converged section whose passage cross sectional area becomes gradually smaller towards the downstream side thereof. At least one portion of an inner surface of the converged section cut by a plane containing the central axis of the main fluid passage is formed by a generally three dimensional curved surface. The inlet of the detecting pipe conduit is disposed in a direction in which the fluid flows, in a manner such that the inlet of the detecting pipe conduit is at a position close to the narrowest portion of the passage cross sectional area of the converged section.

17 Claims, 21 Drawing Sheets

FLOW RATE SENSOR

BACKGROUND OF THE INVENTION

1. Field of the Invention

The present invention relates to a flow rate sensor which is usually employed to measure an intake air flow rate in an internal combustion engine, particularly relates to a flow rate sensor which is used to measure the flow rate of a fluid on the basis of a heat transfer phenomenon where a heat is transferred either from a heating element or from a portion heated by the heating element to the fluid.

2. Description of the Related Art

Japanese Unexamined Patent Publication No. 8-313318 has disclosed a thermo-sensitive type flow rate sensor which is used to measure the flow rate of a fluid flowing through a predetermined flowing passage, on the basis of a heat transfer phenomenon where a heat is transferred either from a heating element or from a portion heated by the heating element to the fluid.

FIG. 36 is a front view illustrating a conventional thermo-sensitive type flow rate sensor disclosed in Japanese Unexamined Patent Publication No. 8-313318. FIG. 37 is a cross sectional view of the thermo-sensitive type flow rate sensor of FIG. 36.

Referring to FIGS. 36 and 37, a detecting pipe conduit 19, which is formed with a bell mouth portion, is located within a main fluid passage 16 through which a fluid (whose flow rate is to be measured) flows. The fluid flows from the left to the right in FIG. 37 through the main fluid passage 16, and a flow rate detecting element 12 is disposed within the detecting pipe conduit 19.

The flow rate detecting element 12 is comprised of a ceramic substrate and a platinum layer formed by depositing platinum served as a thermo-sensitive electrically resistant material on the surface of the ceramic substrate. The thermo-sensitive electrically resistant material has a property whereby the electric resistance will change with changes in temperature. Further, the platinum layer is formed into a tooth pattern (a meander pattern) so as to serve as a flow rate detecting resistance 11. Moreover, a fluid temperature compensating resistance 13, which is used to compensate a temperature change of the flowing fluid, is also made of a platinum which is the thermo-sensitive electrically resistant material, and is disposed upstream of the detecting pipe conduit 19. A fluid rectifying grating means 17 is made of a resin and is formed into a honeycomb structure. Such fluid rectifying grating means 17 is positioned close to the inlet of the main fluid passage 16.

An electronic circuit case 15 accommodating an electronic circuit board 14 is provided on the outside of the main fluid passage 16. Mounted and fixed on the electric circuit board 14 is an electronic circuit for calculating the flow rate of a flowing fluid. In practice, the electronic circuit is electrically connected with both the flow rate detecting resistance 11 and the fluid temperature compensating resistance 13.

Referring now to FIG. 36, there is provided a connector 18 which is used to supply an electric power from the outside of the main fluid passage 16 to the flow rate sensor, and to obtain a flow rate signal from the flow rate sensor so as to send the flow rate signal to a predetermined place outside the main fluid passage 16.

In use of such conventional thermo-sensitive type flow rate sensor 1, an electric current flowing into the flow rate detecting resistance 11 of the flow rate detecting element 12, is controlled by the electronic circuit attached on the circuit board 14, in a manner such that an average temperature of the flow rate detecting resistance 11 will rise to a predetermined value which is 200° C. higher than a fluid temperature detected by the fluid temperature compensating resistance 13. In more detail, when a flowing fluid quantity is small, an amount of heat being transferred from the flow rate detecting resistance 11 to the flowing fluid will also be small, thus an electric current necessary for heating will decrease. On the other hand, when a flowing fluid quantity is large, an amount of heat being transferred from the flow rate detecting resistance 11 to the flowing fluid will also be large, thus an electric current necessary for heating will be increased. Thus, in a thermo-sensitive type flow rate sensor 1, an electric current for heating the resistance 11 is detected and used as a fluid rate signal, thereby detecting an actual flow rate of a fluid flowing through the main fluid passage 16 having a predetermined cross section area.

The thermo-sensitive type flow rate sensor 1, which is constructed in the above mentioned manner, is often used as an intake air flow rate sensor for an automobile engine, as shown in FIG. 38. Referring to FIG. 38, the flow rate sensor 1 is positioned within an intake air pipe 4 which is located downstream of an air cleaner element 2 enclosed in an air cleaner case 3. The air cleaner element 2 is a filter means made of a non-woven fabric or a filter paper, which is used to capture the dust entrained in the intake air so as to prevent it from entering the engine. However, after an automobile has been running for a certain long time, the air cleaner element 2 will get blocked due to the dust. Thus, an air flow having passed through the air cleaner element 2, when compared with a fluid having passed through a non-dust-blocked air cleaner element 2, will be more easily subjected to a change in the flow speed distribution of a fluid on the downstream side of the air cleaner element 2 before the fluid arrives at the flow rate sensor 1.

In fact, the flow rate detecting element 12 of the flow rate sensor 1 can detect only a part of the fluid flowing through the entire cross section of the main fluid passage 16. Accordingly, although the total quantity of a fluid flowing through the main fluid passage 16 does not change, a change in the flow speed distribution of a fluid on the upstream side of the flow rate sensor 1, will bring about an error to a flow rate detecting result.

In order to solve the above problem, it has been suggested that a fluid rectifying grating means 17 be provided in the main fluid passage 16 upstream of the flow rate sensor 1, as shown in FIGS. 36 and 37. Another conventional flow rate sensor has been disclosed in Japanese Unexamined Patent Publication No. 7-71985. In order to obtain a sufficient fluid rectifying effect, this conventional flow rate sensor employs a honeycomb structure, a net-like grating structure or a combination the honeycomb structure and the net-like grating structure.

Further, Japanese Unexamined Patent Publication Nos. 5-340778, 2-28520, 6-288805, have disclosed that a main fluid passage may be converged to have a Venturi shape as shown in FIG. 39, thereby obtaining a similar fluid rectifying effect.

Thus, a conventional flow rate sensor usually involves a fluid rectifying grating means 17 to rectify the fluid whose flow rate is to be measured. On the other hand, to obtain a sufficient rectifying effect, such kind of fluid rectifying means should be made so that the holes formed therethrough are quite small and that each unit area has a lot of such holes. However, since the fluid rectifying means has a honeycomb structure and since such rectifying means is required to have a sufficient rigidity, it is difficult to manufacture the fluid rectifying means with a lot of holes. As a result, a finally obtained fluid rectifying means has only a small aperture ratio (a small aperture area).

Further, since fluids flowing across many holes of a fluid rectifying means are unstable, a lot of small eddies will get together to form an irregularly large flowing of the fluid. As a result, there will occur a not uniform phenomenon in both the boundary layer thickness and the frictional stress around the detecting section of the flow rate sensor, hence causing fluctuations and errors in a flow rate detecting signal and thus making it impossible to perform a correct flow rate detection.

Moreover, it is understood that the ventilation resistance on the flow rate sensor 1 is large, hence an amount of intake air to be supplied to an automobile engine will be small, resulting in a problem that the automobile engine can only produce a small output power. In addition, since there are other fluid rectifying means in addition to the main fluid passage 16, the manufacturing cost is high.

Further, when a flow rate sensor employs a flow rate detecting element which is compact in size and capable of a quick response, and if a fluid rectifying means is positioned upstream of the flow rate detecting element, the flow rate sensor is likely to receive an undesired influence such as a turbulence caused by the fluid rectifying means. As a result, noise components possibly contained in a flow rate detecting signal will increase, making it difficult to perform the flow rate detection with a high precision.

On the other hand, in a conventional flow rate sensor which has been formed by using one section of the main fluid passage 16A converged into a Venturi shape, it is possible to obtain a sufficient fluid rectifying effect by setting a large converging ratio (a cross section area perpendicular to the main fluid axis at the inlet of the main fluid passage/a cross section area perpendicular to the main fluid axis at the narrowest converged portion).

However, when such a converging ratio is large, a fluid flowable cross section area will be small. Consequently, a ventilation resistance will be increased, resulting in a problem that the amount of an intake air being supplied to an internal combustion engine will be undesirably limited. Further, if such a converging ratio is large, the curvature of a curved surface forming a converged portion of the fluid main passage 16A will change rapidly, causing the direction of a fluid flowing therethrough to be suddenly changed. As a result, a fluid cracking phenomenon will occur in the flowing fluid, rendering a flow rate detecting signal to be unstable, hence making it impossible to perform a correct flow rate detection.

Moreover, since a portion of the fluid is stopped by a coupling portion of the fluid rectifying grating means 17 and the main fluid passage 16A, some dead fluid portions will occur in the fluid passage.

SUMMARY OF THE INVENTION

In view of the above discussed problems associated with the above mentioned prior arts, it is an object of the present invention to provide an improved flow rate sensor involving only a small pressure loss and may be manufactured with a low cost, capable of correctly detecting the flow rate of a fluid even if there is a change in the flow speed distribution on the upstream side of the flow rate sensor.

In order to achieve the above objects, according to one aspect of the present invention, there is provided an improved flow rate sensor comprising: a main fluid passage for a fluid to flow therealong; a temperature sensing element for sensing the temperature of the fluid; a flow rate detecting element including a flow rate detecting resistance made of a thermo-sensitive electrically resistant material, the flow rate detecting element being disposed in the main fluid passage in a manner such that the flow rate detecting resistance is exposed to the fluid flowing therethrough; and a control circuit for controlling an electric current flowing to the flow rate detecting resistance such that the temperature of the flow rate detecting resistance may be maintained at a predetermined value which is higher to some extent than a fluid temperature detected by the temperature sensing element. Here, the flow rate of the fluid flowing along the main fluid passage is measured on the basis of a heat transfer phenomenon from the above flow rate detecting resistance to the fluid. The flow rate sensor of the present invention is characterized in that: the main fluid passage involves a converged section whose passage cross sectional area becomes gradually smaller towards the downstream side thereof; at least one portion of an inner surface of the converged section cut by a plane containing the central axis of the main fluid passage is formed by a generally three dimensional curved surface; and the flow rate detecting element is disposed in a direction in which the fluid flows, at a position close to the narrowest portion of the passage cross sectional area of the converged section.

According to another aspect of the present invention, there is provided another improved flow rate sensor, comprising: a main fluid passage for a fluid to flow therealong; a detecting pipe conduit coaxially disposed in the main fluid passage; a temperature sensing element for sensing the temperature of the fluid; a flow rate detecting element including a flow rate detecting resistance made of a thermo-sensitive electrically resistant material, the flow rate detecting element being disposed in the detecting pipe conduit in a manner such that the flow rate detecting resistance is exposed to the fluid flowing therethrough; and a control circuit for controlling an electric current flowing to the flow rate detecting resistance such that the temperature of the flow rate detecting resistance may be maintained at a predetermined value which is higher to some extent than a fluid temperature detected by the temperature sensing element. Here, the flow rate of the fluid flowing along the main fluid passage is measured on the basis of a heat transfer phenomenon from the above flow rate detecting resistance to the fluid. The flow rate sensor of the present invention is characterized in that: the main fluid passage involves a converged section whose passage cross sectional area becomes gradually smaller towards the downstream side thereof, at least one portion of an inner surface of the converged section cut by a plane containing the central axis of the main fluid passage is formed by a generally three dimensional curved surface; and the inlet of the detecting pipe conduit is disposed in a direction in which the fluid flows, in a manner such that the inlet is at a position close to the narrowest portion of the passage cross sectional area of the converged section.

According to a further aspect of the present invention, there is provided a further improved flow rate sensor, comprising: a main fluid passage for a fluid to flow therealong; a detecting pipe conduit coaxially disposed in the main fluid passage; a temperature sensing element for sensing the temperature of the fluid; a flow rate detecting element including a flow rate detecting resistance made of a thermo-sensitive electrically resistant material, the flow rate detecting element being disposed in the detecting pipe conduit in a manner such that the flow rate detecting resistance is exposed to the fluid flowing therethrough; and a control circuit for controlling an electric current flowing to the flow rate detecting resistance such that the temperature of the flow rate detecting resistance may be maintained at a predetermined value which is higher to some extent than a fluid temperature detected by the temperature sensing element. Here, the flow rate of the fluid flowing along the main fluid passage is measured on the basis of a heat transfer phenomenon from the above flow rate detecting resistance to the fluid. The flow rate sensor of the present invention is characterized in that: the detecting pipe conduit involves a converged section whose passage cross sectional area becomes gradually smaller towards the downstream side thereof; at least one portion of an inner surface of the converged section cut by a plane containing the central axis of the main fluid passage is formed by a generally three dimensional curved surface; and the flow rate detecting element is disposed in a direction in which the fluid flows, at a position close to the narrowest portion of the passage cross sectional area of the converged section.

DESCRIPTION OF THE PREFERRED EMBODIMENTS

Some preferred embodiments of the present invention will be described in detail below with reference to the accompanying drawings.

Embodiment 1

A first embodiment of the present invention will be described with reference to FIGS. 1 and 2.

Figure 1:
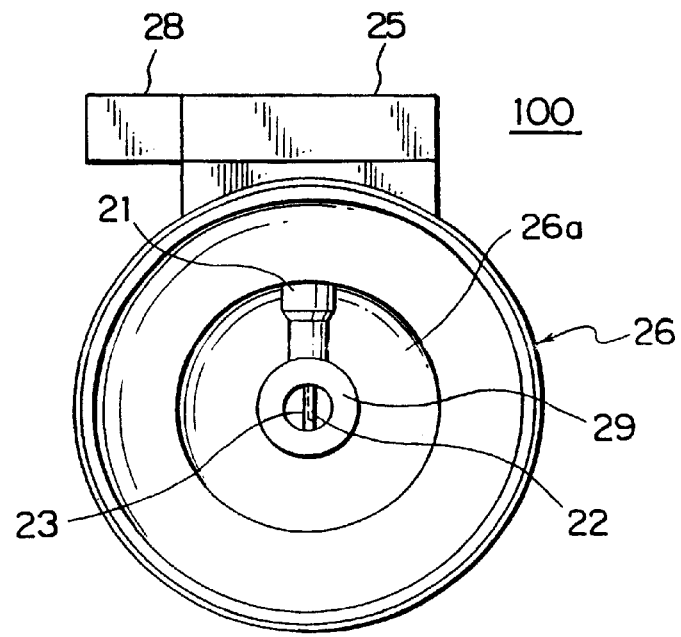
FIG. 1 is a front view illustrating a flow rate sensor made according to a first embodiment of the present invention.

FIG. 1 is a front view illustrating a flow rate sensor made according to the first embodiment of the present invention. FIG. 2 is a sectional view in side elevation illustrating the flow rate sensor of FIG. 1.

Figure 2:
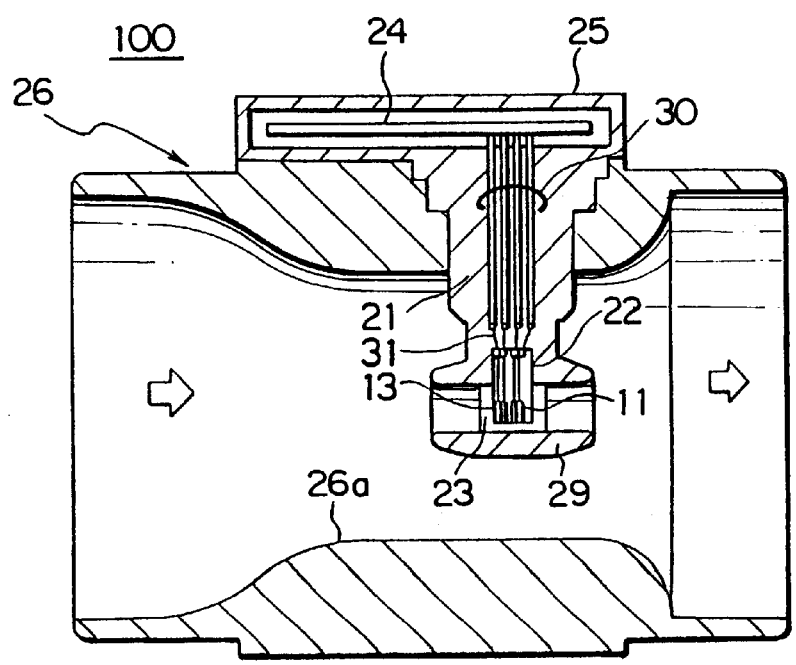
FIG. 2 is a sectional view in side elevation illustrating the flow rate sensor made according to the first embodiment of the present invention.

Referring to FIGS. 1 and 2, a main fluid passage 26 is a cylindrical pipe through which flows a fluid whose flow rate is to be measured. The main fluid passage 26 has a converged section 26a whose cross sectional area perpendicular to the central axis of the main fluid passage 26, hereinafter referred as the passage cross sectional area, gradually becomes smaller from an inlet towards the downstream side. The inner surface of the converged section 26a cut by a plane containing the central axis of the main fluid passage 26 is formed by a three dimensional curved surface. A support section 21 is formed on the inner surface of the main fluid passage 26. A cylindrical detecting pipe conduit 29 is supported by the support section 21 within the main fluid passage 26, such that it forms a coaxial relationship with the passage 26. The detecting pipe conduit 29 is so arranged that its inlet is located close to a position corresponding to a narrowest portion of the passage cross sectional area of the converged section 26a. Further, a plate member 23 is integrally provided within the detecting pipe conduit 29 in such a manner that the central axis of the detecting pipe conduit 29 is located on the main surface of the plate member 23. Moreover, a circuit case 25 is provided on the outer surface of the main fluid passage 26. The circuit case 25 is used to accommodate a circuit board 24 mounting a control circuit capable of calculating the flow rate of a fluid flowing in the fluid passage 26. In addition, a connector 28 is provided adjacent to the circuit case 25. The connector 28 is used to supply an electric power from the outside of the fluid passage 26 to the flow rate sensor 100, and to transmit flow rate detection signals from the flow rate sensor 100 to the outside of the fluid passage 26.

A flow rate detecting element 22 is comprised of a ceramic substrate and a platinum layer formed by depositing platinum served as the thermo-sensitive electrically resistant material on the surface of the ceramic substrate. The thermo-sensitive electrically resistant material has a property whereby the electric resistance will change with changes in temperature. Further, the platinum layer is formed into a tooth pattern (a meander pattern) so as to form a flow rate detecting resistance 11 and a fluid temperature compensating resistance 13 (serving as a temperature sensing element). Thus, both the flow rate detecting resistance 11 and the fluid temperature compensating resistance 13 are formed on the surface of the ceramic substrate. In fact, the flow rate detecting element 22 is fixed on the plate member 23 so that its outer surface is almost at the same level as the main plane of the plate member 23, with one end thereof (the detecting element 22) being fixedly buried in the support section 21. Here, the surface of the detecting element 22 is substantially parallel with the axial direction of the detecting pipe conduit 29, i.e., substantially parallel with the axial direction of the flow rate sensor 100. Further, the flow rate detecting resistance 11 and the fluid temperature compensating resistance 13 are connected to the electronic control circuit fixedly mounted on the circuit board 24 through a plurality of lead wires 31 and a plurality of terminals.

Although the flow rate detecting resistance 11 and the fluid temperature compensating resistance 13 are all formed on the ceramic substrate, the flow rate detecting element 22 is provided with a thermally insulating means (not shown) which is used to prevent a heat conduction from the flow rate detecting resistance 11 to the fluid temperature compensating resistance 13.

However, in the present embodiment and all the flowing embodiments which will be described in detail below, it is possible to dispense with the fluid temperature compensating resistance 13 as long as the flow rate detecting resistance 11 is provided on the detecting element 22. Further, the substrate of the detecting element 22 is not necessarily a ceramic substrate, it is also possible to employ a silicon substrate. Moreover, for use as the thermo-sensitive electrically resistant material, it is not necessarily to use a platinum, in fact it is also possible to use a nickel or a permalloy.

With the use of the flow rate sensor 100, after a fluid including different velocity portions has flowed into the main fluid passage 26, the flowing speed of the fluid will be increased when passing through the converged section 26a whose inner surface cut by a plane containing the central axis of the main fluid passage 26 is formed by a three dimensional curved surface, thereby a dynamic pressure of the fluid gradually increasing and a static pressure of the fluid gradually decreasing. Consequently, fluid components flowing in a direction perpendicular to the fluid main axis will be reduced, since most of them are converted into fluid components flowing in the fluid main axis direction, thereby obtaining a uniform speed distribution for the fluid flowing in the main axis direction. Thus, the fluid, whose speed distribution has been rectified in the fluid main axis direction by the converged section 26a, will flow into the detecting pipe conduit 29 so as to arrive at the flow rate detecting element 22.

An electric current is supplied to the flow rate detecting resistance 11 of the detecting element 22 so as to produce a predetermined amount of heat. The heat from the flow rate detecting resistance 11 will be conducted by way of heat transfer phenomenon to a fluid which has already arrived at the detecting element 22. The amount of heat being transferred from the resistance 11 to a fluid arriving at the detecting element 22 will become larger when there is an increase in the flow rate of the fluid. Thus, the temperature of the flow rate detecting resistance 11 will change along with a change in the amount of heat being transferred from the resistance 11 to the fluid.

The electric current flowing into the flow rate detecting resistance 11 is controlled by a control circuit mounted on the circuit board 24, in a manner such that an average temperature of the resistance 11 will rise to a predetermined value which is 200° C. higher than a fluid temperature detected by the fluid temperature compensating resistance 13. Therefore, by making use of the electric current (for heating) as a flow rate signal, it is possible to detect the flow rate of a fluid flowing through the passage 26 having a predetermined cross section area.

Further, with the use of the flow rate sensor 100, even if a fluid on the upstream side of the flow rate sensor contains different velocity portions, it will be rectified by the converged portion 26a, so that a uniform speed distribution may be obtained for the fluid flowing in the fluid main axis direction before its flowing into the detecting pipe conduit 29. Accordingly, even if a fluid flowing into the passage 26 involves different velocity portions, these different velocity portions will be rectified so as to obtain a uniform speed distribution for the fluid before its arrival at the detecting element 22. In this manner, a drift of flow rate detecting result may be prohibited, thereby eliminating or at least inhibiting any possible detection error.

In this way, since the speed distribution of the flowing fluid is rectified by the converged section 26a, it is not necessary to provide a fluid rectifying means, thereby permitting a low cost in the manufacturing of such a flow rate sensor. Further, since it is allowed to dispense with a fluid rectifying means which is usually formed with a lot of small apertures, it is sure to avoid any uncontrollable fluctuations of a flow rate detection signal, which is often caused due to a fluid flowing across numerous small apertures on a fluid rectifying means, thereby effecting a correct and reliable flow rate detection.

Further, since the inner surface of the converged section 26a cut by a plane containing the central axis of the main fluid passage 26 is formed by a three dimensional curved surface, such converged section 26a does not involve any shouldered portions or protrudingly cornered portions, and the change rate of the curvature of the curved surface forming the converged section 26a is small. Thus, when a fluid flows through the converged section 26a, there will not be any dead fluid occurring. Moreover, since the curved surface forming the converged section 26a has a gentle and continuous inclined surface, it is sure to avoid a phenomenon of eddy flows or a fluid cracking which is responsible for some fluid noise, and to reduce a pressure loss.

One of the advantages obtainable by using the flow rate sensor 100 is that it only causes a small pressure loss which is smaller than a pressure loss caused by a conventional flow rate sensor disposed in a main fluid passage involving a converged Venturi type section, and is also smaller than a pressure loss caused by another conventional flow rate sensor involving the use of a fluid rectifying grating means.

Embodiment 2

A second embodiment of the present invention will be described with reference to FIGS. 3 and 4.

Figure 3:
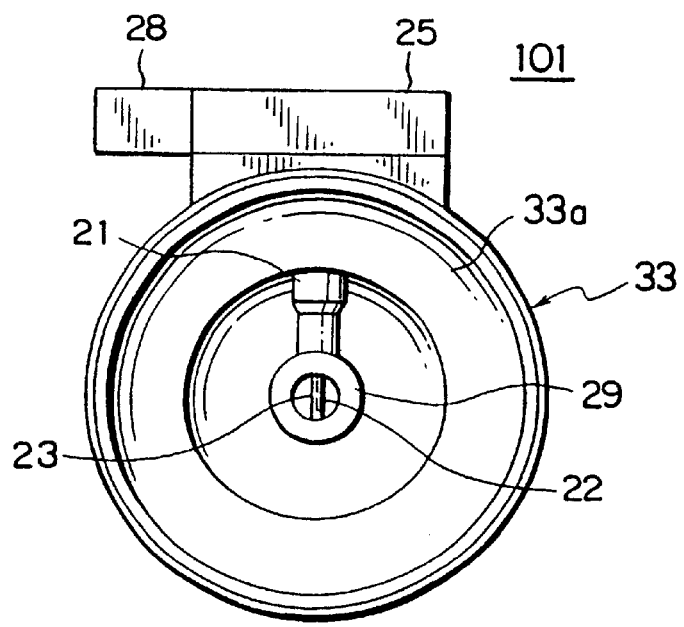
FIG. 3 is a front view illustrating a flow rate sensor made according to a second embodiment of the present invention.
Figure 4:
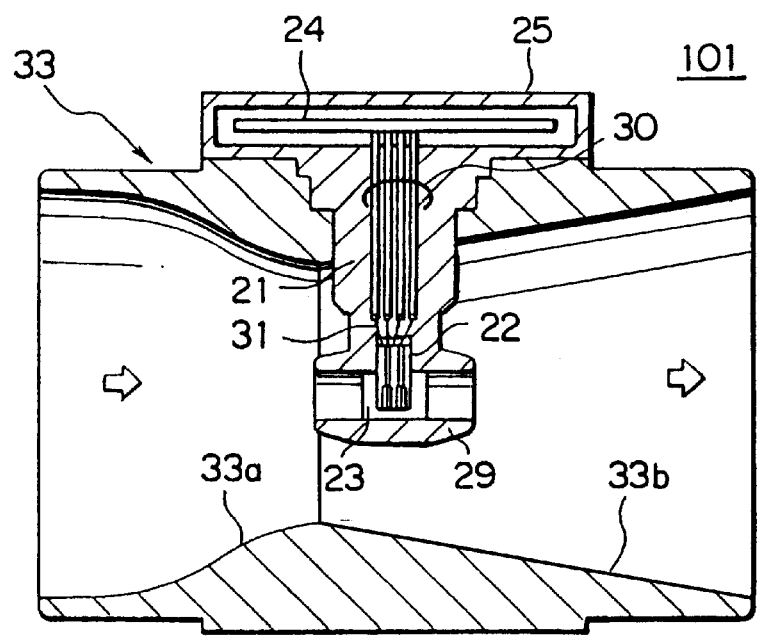
FIG. 4 is a sectional view in side elevation illustrating the flow rate sensor made according to the second embodiment of the present invention.

Referring to FIGS. 3 and 4, a thermo-sensitive type flow rate sensor 101 of the second embodiment is almost the same as that of the first embodiment except the following differences. Namely, a main fluid passage 33 is a cylindrical pipe through which flows a fluid whose flow rate is to be measured. The main fluid passage 33 has a converged section 33a whose passage cross sectional area gradually becomes smaller from a inlet towards the downstream side. The inner surface of the converged section 33a cut by a plane containing the central axis of the main fluid passage 33 is formed by a three dimensional curved surface. Further, the main fluid passage 33 has an enlarged section 33b integrally connected with the converged section 33a, with its passage cross sectional area becoming gradually larger from a narrowest portion of the passage cross sectional area of the converged section 33a towards the downstream side thereof. Similarly, a support section 21 is formed on the inner surface of the main fluid passage 33. A cylindrical detecting pipe conduit 29 is held by the support section 21. The detecting pipe conduit 29 is so arranged that its inlet is located at position corresponding to the narrowest portion of the passage cross sectional area of the converged section 33a.

With the use of the flow rate sensor 101, after a fluid including different velocity portions has flowed into the main fluid passage 33, the flowing speed of the fluid will be increased when passing through the converged section 33a, with a dynamic pressure gradually increasing and a static pressure gradually decreasing. Then, the fluid, having passed through the narrowest passage cross sectional area of the converged section 33a, flows through the enlarged section 33b, with the dynamic pressure gradually decreasing and the static pressure gradually increasing. Namely, a dynamic pressure obtained in the converged section 33a is gradually converted into a static pressure in the enlarged section 33b, making it possible to form a uniform static pressure and thus reducing a pressure loss.

Usually, when the passage cross sectional area of the main fluid passage 33 suddenly changes from the narrowest portion of the passage cross sectional area of the converged section 33a to the downstream side, some eddy flows will occur on the inner surface of the enlarged section of the passage cross sectional area, resulting in a fluid cracking over the inner surface. However, in the second embodiment of the present invention, since the enlarged section 33b is formed with its passage cross sectional area gradually becoming larger towards the downstream side thereof, the fluid is allowed to flow in a stabilized manner along the inner surface of the portion 33b without inducing any eddy flows. In this way, it is possible to effectively prevent a fluid cracking and reduce a pressure loss.

On the other hand, if an angle formed between the inner surface of the enlarged section 33b and the central axis of the main fluid passage 33 is larger than 7 degrees, fluid cracking will occur on the inner surface of the enlarged section 33b, resulting in a large pressure loss. Thus, in order to use the enlarged section 33b to effectively restore an original static pressure for the flowing fluid, it is preferred that an angle formed between the inner surface of the enlarged section 33b and the central axis of the main fluid passage 33 is set to be 7 degrees or smaller.

Embodiment 3

A third embodiment of the present invention will be described with reference to FIGS. 5 and 6.

Figure 5:
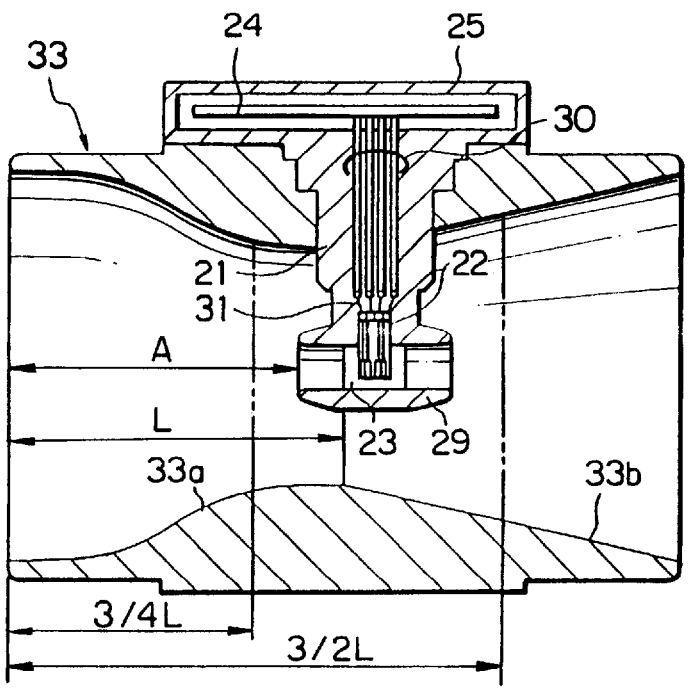
FIG. 5 is a front view illustrating a flow rate sensor made according to a third embodiment of the present invention.

Referring to FIG. 5, a thermo-sensitive type flow rate sensor of the third embodiment is almost the same as that of the second embodiment except the following differences. Namely, a converged section 33a is formed within the main fluid passage 33, a capital letter L is a distance between the inlet of the main fluid passage 33 and the narrowest portion of the passage cross sectional area of the converged section 33a. A detecting pipe conduit 29 is located at a position which is apart from the inlet of the main fluid passage 33 at a distance that is in a range from about 0.75 L to about 1.5 L.

Referring again to FIG. 5, a capital letter A represents a distance between the inlet of the main fluid passage 33 and the inlet of the detecting pipe conduit 29, a capital letter L represents a distance between the inlet of the main fluid passage 33 and the narrowest portion of the passage cross sectional area of the converged section 33a. A plurality of flow rate sensors are manufactured with different A/L ratios for the purpose of test. Flow rate detecting errors and pressure losses with respect to these sensors were measured and results are indicated in FIG. 6.

Figure 6:
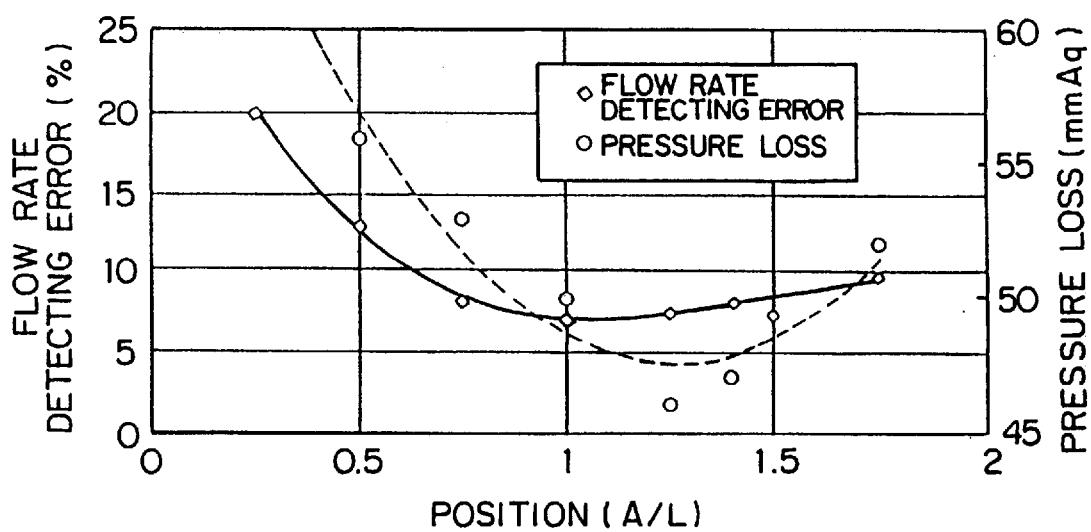
FIG. 6 is a graph indicating a relationship among a position of a detecting pipe conduit of the flow rate sensor (made according to the third embodiment), an error in flow rate detection, and a pressure loss across the flow rate sensor.

As can be understood in FIG. 6, a flow rate detecting error may be controlled to a low level when an A/L value (representing a position of the detecting pipe conduit 29 in the main fluid passage 33) is in a range form about 0.75 to about 1.5. On the other hand, a pressure loss may be controlled to a minimum level when an A/L value is about 1.25. Further, when an A/L value is in a range from about 0.75 to about 1.75, a pressure loss is 53 mmAq or less.

Therefore, by setting the detecting pipe conduit 29 in the main fluid passage 33 so as to satisfy an equation $0.75 \leq A/L \leq 1.5$, it is possible not only to minimize a flow rate detecting error but also to minimize a pressure loss across a flow rate sensor.

Although it has been described in the third embodiment that the detecting pipe conduit 29 should be positioned in the main fluid passage 33 so as to satisfy an equation $0.75 \leq A/L \leq 1.5$, it is also possible that the position of the detecting pipe conduit 29 may be set in some different ways corresponding to some allowable flow rate detecting errors. For example, when an allowable error is 10%, the detecting pipe conduit 29 may be positioned in the main fluid passage 33 so as to satisfy an equation $0.6 \leq A/L \leq 1.8$.

Embodiment 4

A fourth embodiment of the present invention will be described with reference to FIGS. 7 and 8.

Figure 7:
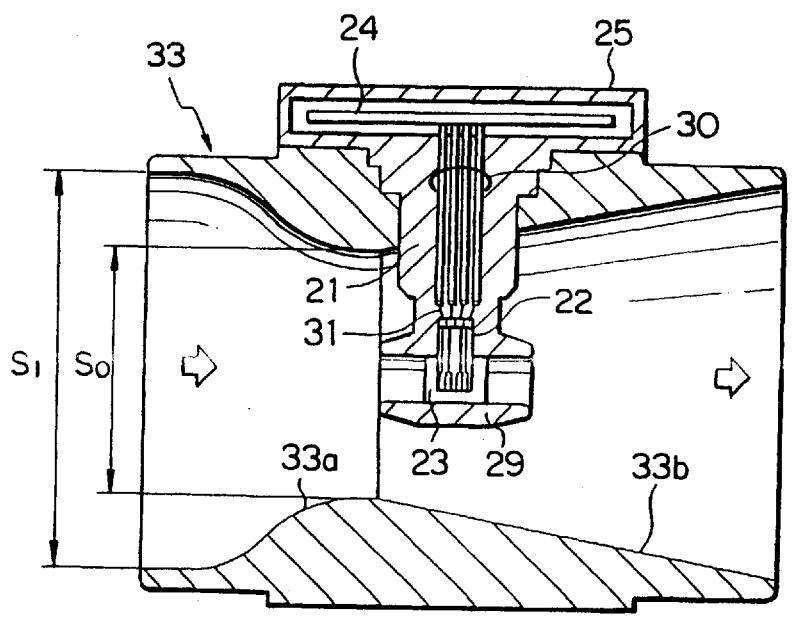
FIG. 7 is a sectional view in side elevation illustrating a flow rate sensor made according to a fourth embodiment of the present invention.

Referring to FIG. 7, a thermo-sensitive type flow rate sensor of the fourth embodiment is almost the same as that of the second embodiment except the following differences. Namely, the converged section 33a of the main fluid passage 33 is so formed that a converging ratio $S_1/S_0$ ($S_1$ is the passage cross sectional area of the inlet of the main fluid passage 33, $S_0$ is the passage cross sectional area of the narrowest portion of the converged section 33a) is in a range of from about 1.5 to about 3.0.

A plurality of flow rate sensors are manufactured with different $S_1/S_0$ ratios for the purpose of test. Flow rate detecting errors and pressure losses with respect to these sensors were measured and results are indicated in FIG. 8.

Figure 8:
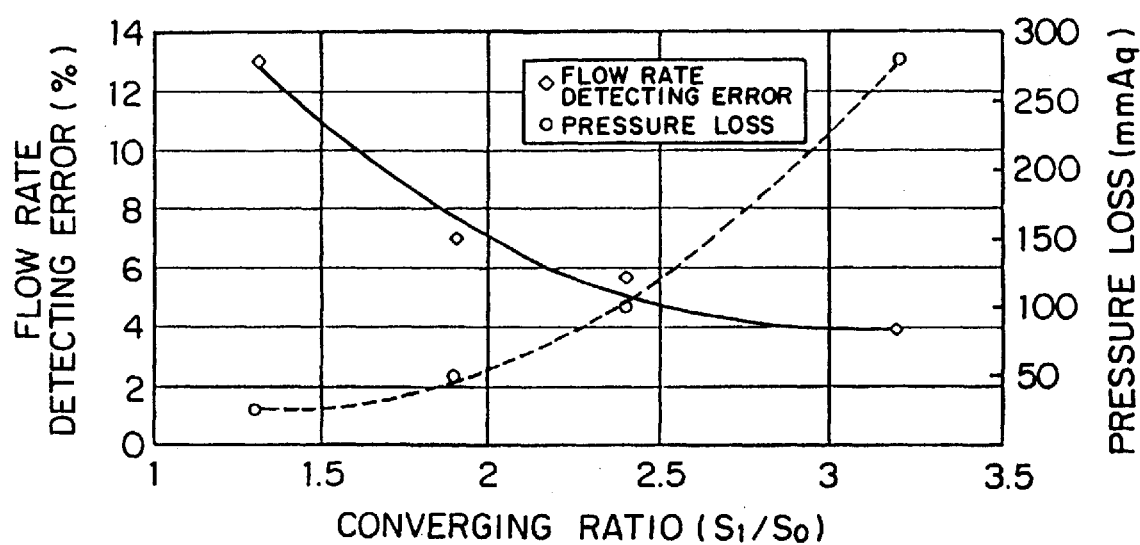
FIG. 8 is a graph indicating a relationship among a converging rate of the flow rate sensor (made according to the fourth embodiment), an error in flow rate detection, and a pressure loss across the flow rate sensor.

As can be understood in FIG. 8, a flow rate detecting error will become smaller when the converging ratio $S_1/S_0$ becomes larger. On the other hand, a pressure loss will become larger when the converging ratio $S_1/S_0$ becomes larger.

Therefore, by forming a converged section 33a so as to satisfy an equation $1.5 \leq S_1/S_0 \leq 3.0$, it is possible to provide a flow rate sensor capable of measuring the flow rate of a flowing fluid, with a flow rate detecting error being controlled at 11% or less and with a pressure loss being controlled at 225 mmAq or lower.

Although it has been described in the fourth embodiment that a converged section 33a should be formed so as to satisfy an equation $1.5 \leq S_1/S_0 \leq 3.0$, it is also possible that a converging ratio $S_1/S_0$ of the converged section 33a may be set in some different ways corresponding to an allowable flow rate detecting error and an allowable pressure loss, just as in the above third embodiment of the present invention.

Embodiment 5

A fifth embodiment of the present invention will be described with reference to FIGS. 9 and 10.

Figure 9:
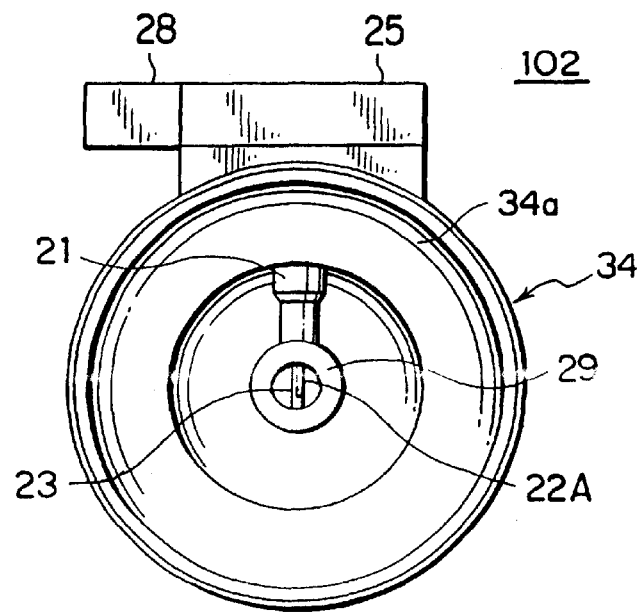
FIG. 9 is a front view illustrating a flow rate sensor made according to a fifth embodiment of the present invention.
Figure 10:
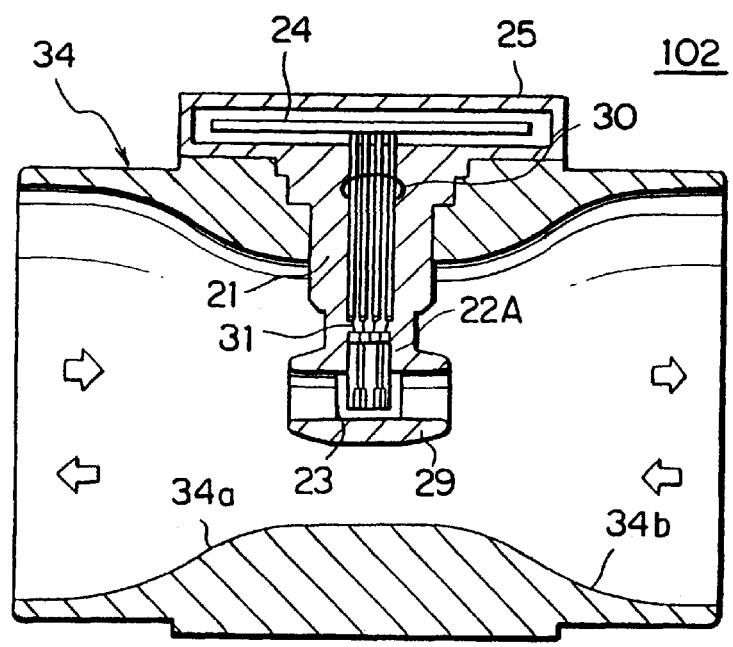
FIG. 10 is a sectional view in side elevation illustrating a flow rate sensor made according to the fifth embodiment of the present invention.

Referring to FIGS. 9 and 10, a thermo-sensitive type flow rate sensor 102 of the fifth embodiment is similar to that of the first embodiment except the following differences. Namely, a main fluid passage 34 is a cylindrical pipe through which flows a fluid whose flow rate is to be measured. The main fluid passage 34 has a converged section 34a whose passage cross sectional area gradually becomes smaller from a inlet thereof towards the downstream side. In practice, such a converged section 34a is formed by a three dimensional curved surface. Further, the main fluid passage 34 has a enlarged section 34b integrally connected with the converged section 34a, with its passage cross sectional area becoming gradually larger from a narrowest portion of the passage cross sectional area of the converged section 34a towards the downstream side thereof. Similarly, the enlarged section 34b is formed by a three dimensional curved surface. Moreover, the inner wall of the converged section 34a and the inner wall of the enlarged section 34b are integrally formed together so as to present a continuous curved surface which is geometrically symmetrical with the narrowest portion of the passage cross sectional area of the converged section 34a as a geometric center. In addition, the detecting pipe conduit 29 is arranged in a manner such that its inlet is located in or at least close to a position corresponding to the narrowest portion of the passage cross sectional area of of the converged section 34a.

In the present embodiment, a flow rate detecting element 22A and an electronic control circuit fixedly mounted on a circuit board 24 are all the same as those disclosed in Japanese Patent Application Laid-open No.1-185416, thus it is possible not only to detect the flow rate of a flowing fluid, but also to detect its flowing direction.

With the use of the flow rate sensor 102, after a fluid including different velocity portions has flowed into the main fluid passage 34, the flowing speed of the fluid will be increased when passing through the converged section 34a, with a dynamic pressure gradually increasing and a static pressure gradually decreasing. Consequently, fluid components flowing in a direction perpendicular to the fluid main axis will be reduced, since most of them are converted into fluid components flowing in the fluid main axis direction, thereby obtaining a uniform speed distribution for the fluid flowing in the main axis direction. Thus, the fluid, whose speed distribution has been rectified in the fluid main axis direction by the converged section 34a, will flow into the detecting pipe conduit 29 so as to arrive at the flow rate detecting element 22.

Further, the flowing fluid, upon passing through the narrowest portion of the passage cross sectional area of the converged section 34a, is rendered to return back to its original condition so that its dynamic pressure gradually decreases and its static pressure gradually increases, thereby making it possible to reduce a pressure loss across the flow rate sensor 102.

In this way, since the inner wall of the converged section 34a and the inner wall of the enlarged section 34b have been integrally formed together to form a geometrically symmetrical curved surface, a fluid which has flowed into the main fluid passage 34 through the outlet thereof, that is, a opening of the enlarged section 34b side, will be rectified so that its different velocity portions can be converted into similar fluid portions having an identical flowing speed in the fluid main axis direction, thereby reducing a pressure loss.

Besides some effects similar to those obtainable in the first and second embodiments, the fifth embodiment of the present invention provides a further effect that the curvature of the curved surface forming the inner wall of the main fluid passage 34 has only a small change rate in a direction of the main fluid axis, owing to a fact that the inner wall of the main fluid passage 34 does not involve any discontinuous surfaces, or cornered portions or shouldered portions. In this way, since the inner wall of the main fluid passage 34 is a continuous and gently curved surface, there will not occur any fluid cracking, thereby making it possible to reduce any disturbance in flow rate detection, and reduce a pressure loss.

In addition, since the inner wall of the converged section 34a and the inner wall of the enlarged section 34b have been integrally formed together to form a geometrically symmetrical curved surface, a desired flow rate detection can be effected all the time, regardless of whether the fluid arrives at the flow rate sensor 102 through the left side or through the right side thereof (as seen in FIG. 10).

Recently, with regard to the control of an automobile engine, exhaust gas and specific fuel consumption have been severely restricted in these years. As a flow rate sensor for measuring the flow rate of an intake air being supplied to the engine, it is desired to be capable of measuring an adverse flow induced by a positive pressure on the exhaust side. Such adverse flow usually happens in a four-cylinder engine when it is in a condition of low speed and high load, and at this time, an intake air flow will have a fluctuation with the passing of time, with the engine in an over-lap state when both the intake valve and exhaust valve are in their opened positions.

Therefore, when the flow rate sensor 102 made according to the fifth embodiment of the present invention is used to measure the flow rate of an intake air being supplied to an automobile engine, such a sensor 102 is quite effective for measuring both the flow rate of an intake air and the flow rate of an adverse flow which is induced by a positive pressure on the exhaust side when the automobile engine is in an over-lap state. Further, when measuring the flow rate of an adverse flow, it is sure to reduce some noise components possibly contained in a flow rate detection signal and obtain a uniform flowing speed distribution for a fluid flowing in a direction of the fluid main axis, thereby permitting a correct flow rate detection with a high precision.

Further, when the flow rate sensor 102 of the fifth embodiment is used to measure the flow rate of an intake air being supplied to an automobile engine, the sensor 102 is allowed to be installed close to either the inlet side or the outlet side in the main fluid passage 34, while obtaining the same detection result.

Embodiment 6

A sixth embodiment of the present invention will be described with reference to FIGS. 11, 12 and 13.

Figure 11:
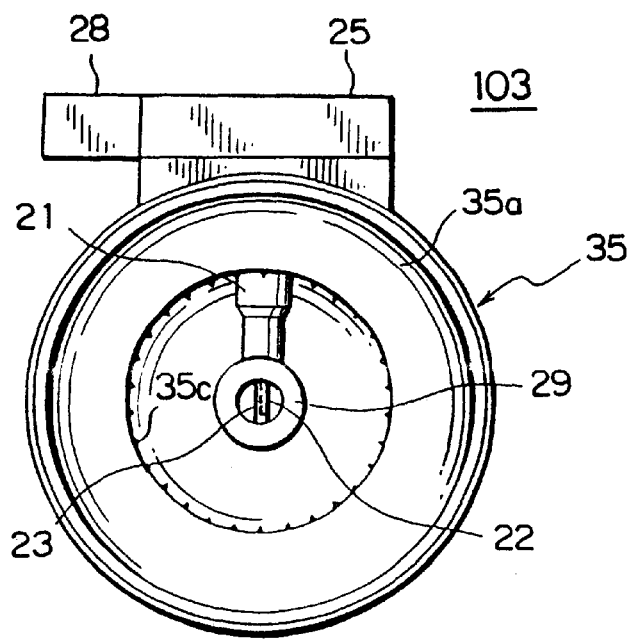
FIG. 11 is a front view illustrating a flow rate sensor made according to a sixth embodiment of the present invention.
Figure 12:
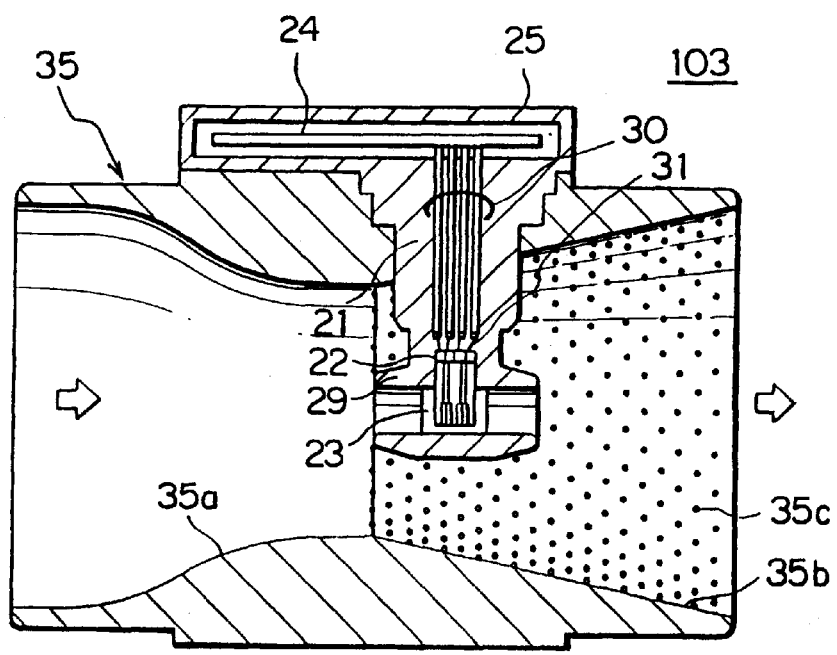
FIG. 12 is a sectional view in side elevation illustrating a flow rate sensor made according to the sixth embodiment of the present invention.
Figure 13:
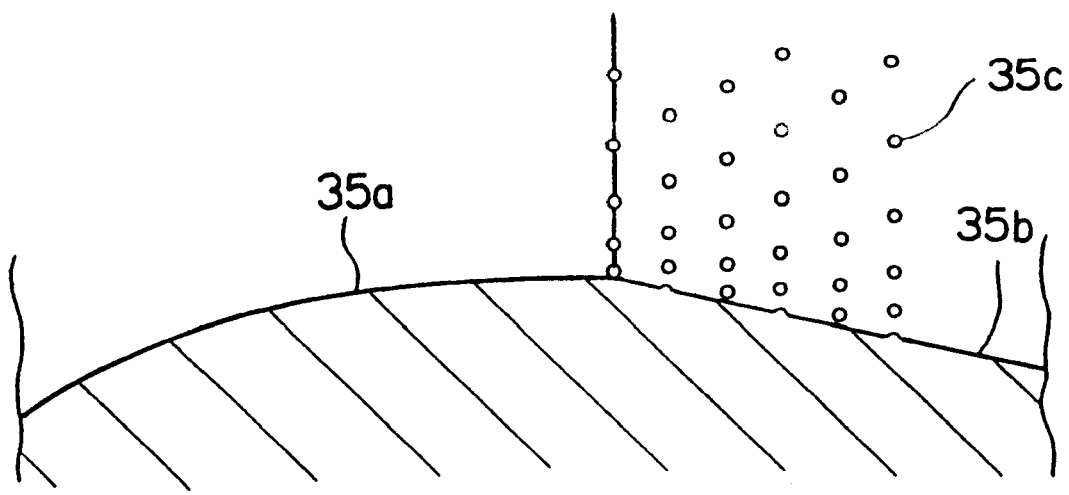
FIG. 13 is an enlarged cross sectional view illustrating an important portion of the flow rate sensor made according to the-sixth embodiment of the present invention.

Referring to FIGS. 11 and 12, a thermo-sensitive type flow rate sensor 103 of the sixth embodiment is similar to that of the second embodiment except the following differences. Namely, a main fluid passage 35 is a cylindrical pipe through which flows a fluid whose flow rate is to be measured. The main fluid passage 35 has a converged section 35a whose passage cross sectional area gradually becomes smaller from a inlet thereof towards the downstream side. In practice, such a converged section 35a is formed by a three dimensional curved surface. Further, the main fluid passage 35 has a enlarged section 35b integrally connected with the converged section 35a, with its passage cross sectional area becoming gradually larger from the narrowest portion of the passage cross sectional area of the converged section 35a towards the downstream side thereof. Moreover, as shown in FIG. 13, a lot of small projections 35c are formed on the inner surface of the enlarged section 35b. Similarly, the detecting pipe conduit 29 is arranged in a manner such that its inlet is located in or at least close to a position corresponding to the narrowest portion of the converged section 35a.

Usually, when a fluid flows from a small diameter section to an enlarged section, its flowing speed will suddenly decrease. As a result, the fluid flowing over the inner surface of the enlarged section is subject to the wall frictional resistance, hence inducing eddy flows and fluid cracking.

With the use of the flow rate sensor 103 of the sixth embodiment, since the inner surface of the enlarged section 35b is formed on a scabrous surface by forming a lot of small projections 35c on the inner surface of the enlarged sections 35b, a lot of small eddy flows will be induced, so that a fluid layer in contact with the inner surface will be disturbed. In this way, the wall frictional resistance on the scabrously formed inner surface of the enlarged section 35b will decrease, thereby inhibiting the formation of a fluid cracking and reducing a pressure loss.

Figure 14:
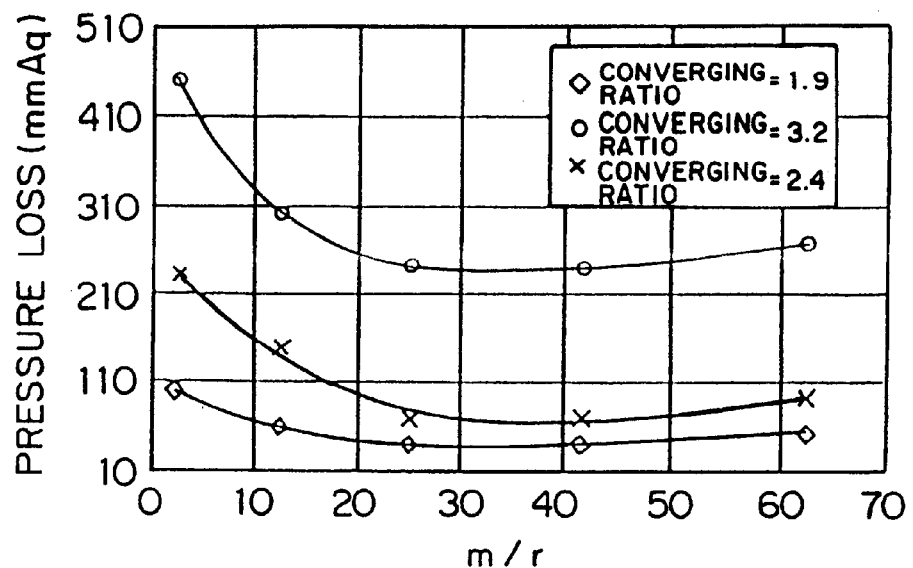
FIG. 14 is a graph indicating a relationship between m/r and pressure loss of the flow rate sensor of the sixth embodiment of the present invention.

Here, if "r" represents a maximum height of the small projections 35c formed on an inner surface of the converged section 35a corresponding to its narrowest portion, "m" represents an average depth of a fluid, thus a plurality of flow rate sensors may be manufactured with different m/r values. FIG. 14 indicates a relationship between a m/r value and a pressure loss of the flow rate sensor made according to the present embodiment. In detail, an average depth "m" means a ratio of (passage cross sectional area of the converged section 35a corresponding to its narrowest portion)/ (circumferential length of a passage cross sectional area of the converged section 35a corresponding to its narrowest portion). Three flow rate sensors with different converging ratios (1.9, 2.4, 3.2) are manufactured. Then, these flow rate sensors were tested and their results are indicated in FIG. 14.

As may be understood from FIG. 14, with various flow rate sensors having different converging ratios, a pressure loss may be prohibited to a minimum value if an m/r ratio is in a range of about 25 to about 40. Nevertheless, a reason for this phenomenon may be explained as flows.

Namely, when a fluid having passed through the converged section 35a arrives at the narrowest portion thereof, there will occur a lot of small eddy flows due to a lot of small projections 35c. Then, these small eddy flows will move along the inner surface of the enlarged section 35b, thus promoting a turbulence in a fluid layer flowing over the inner surface. Consequently, the wall frictional resistance on the inner surface of the enlarged section 35b will become relatively small, thereby prohibiting a large scale fluid cracking and thus reducing a pressure loss.

In this way, with the use of the flow rate sensor 103 made according to the sixth embodiment of the present invention, it is possible not only to obtain the same effects as in the first and second embodiments, but also to reduce the wall frictional resistance on the inner surface of the enlarged section 35b, thereby reducing a pressure loss.

Further, by setting the m/r ratio (m: fluid average depth; r: a maximum height of the projections 35c) in a range of about 25 to about 40, it is possible to minimize a pressure loss.

Although it has been described in the present embodiment that the main fluid passage 35 is a cylindrical pipe having a circular cross section, it is also possible that such a main fluid passage 35 may have a rectangular or other polygonal cross section. If a main fluid passage 35 has a rectangular or other polygonal cross section, the m/r ratio (m: fluid average depth; r: a maximum height of the projections 35c) should also be set in a range of about 25 to about 40 so as to obtain the same effect.

Embodiment 7

A seventh embodiment of the present invention will be described with reference to FIGS. 15, 16 and 17.

Figure 15:
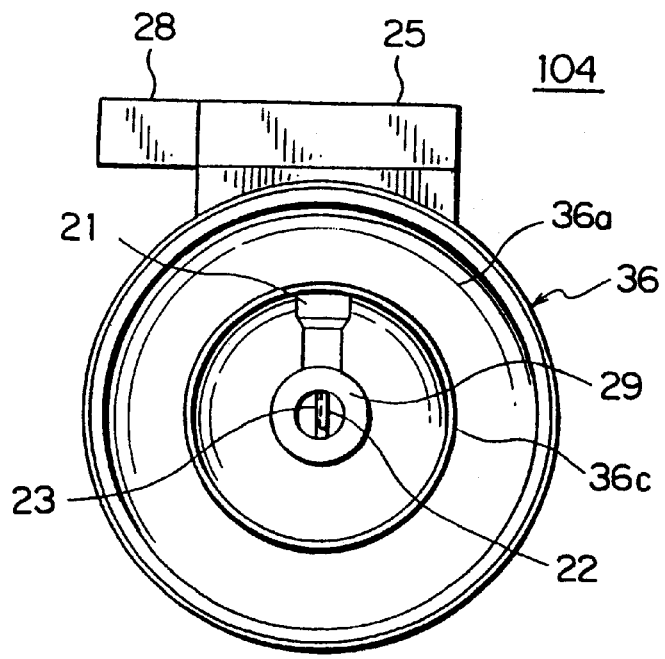
FIG. 15 is a front view illustrating a flow rate sensor made according to a seventh embodiment of the present invention.
Figure 16:
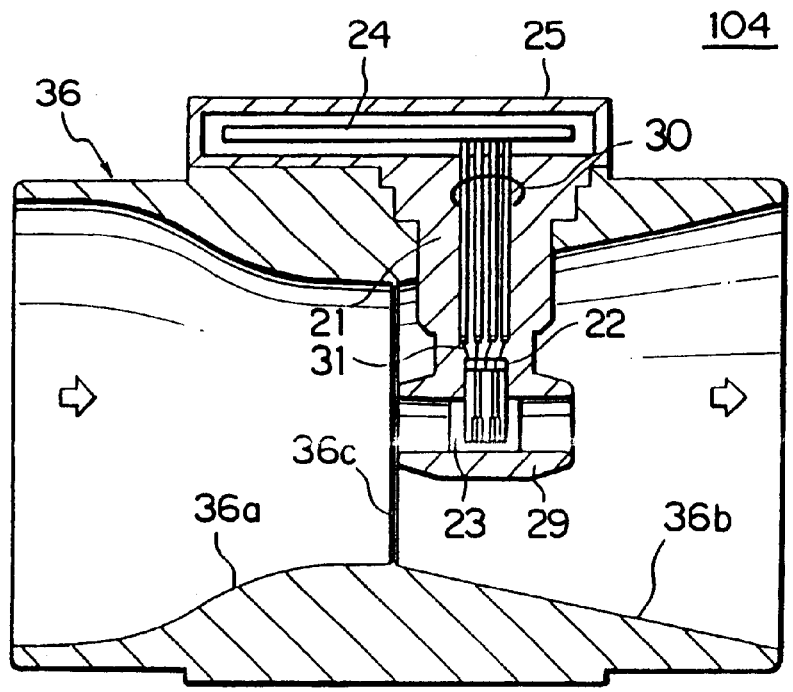
FIG. 16 is a sectional view in side elevation illustrating a flow rate sensor made according to the seventh embodiment of the present invention.
Figure 17:
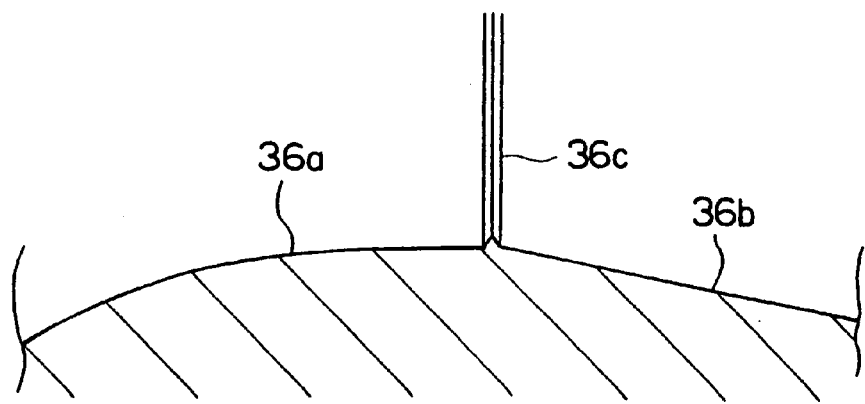
FIG. 17 is an enlarged cross sectional view illustrating an important portion of the flow rate sensor made according to the seventh embodiment of the present invention.

Referring to FIGS. 15 and 16, a thermo-sensitive type flow rate sensor 104 of the seventh embodiment is similar to that of the sixth embodiment except the following differences. Namely, a main fluid passage 36 is a cylindrical pipe through which flows a fluid whose flow rate is to be measured. The main fluid passage 36 has a converged section 36a whose passage cross sectional area gradually becomes smaller from a inlet thereof towards the downstream side. In practice, such a converged section 36a is formed by a three dimensional curved surface. Further, the main fluid passage 36 has an enlarged section 36b integrally connected with the converged section 36a, with its passage cross sectional area becoming gradually larger from the narrowest portion of the passage cross sectional area of the converged section 36a towards the downstream side thereof. Moreover, as shown in FIG. 17, an annular rib 36c is formed on the inner surface of the main fluid passage 36, on a position corresponding to a junction between the converged section 36a and the enlarged section 36b. In practice, such an annular rib 36c has a triangular cross section. Similarly, the detecting pipe conduit 29 is arranged in a manner such that its inlet is located in or at least close to a position corresponding to the narrowest portion of the converged section 36a.

With the use of the flow rate sensor 104 of the seventh embodiment, since an annular rib 36c having a triangular cross section is formed on the inner surface of the main fluid passage 36 corresponding to a junction between the converged section 36a and the enlarged section 36b, when a fluid (having passed through the converged section 36a) flows over the annular rib 36c, small eddy flows will occur, so that a fluid layer in contact with the inner surface of the enlarged section 36b will be disturbed. As a result, the wall frictional resistance on the inner surface of the enlarged section 36b will be reduced to a relatively small value, thereby inhibiting a large scale fluid cracking and reducing a pressure loss across the flow rate sensor.

Finally, similar to the sixth embodiment of the present invention, in this seventh embodiment, if an m/r ratio (m: fluid average depth; r: a maximum height of the annular rib 36c) is set in a range of about 25 to about 40, it is sure to obtain the same effect as in the sixth embodiment.

Embodiment 8

An eighth embodiment of the present invention will be described with reference to FIGS. 18, 19 and 20.

Figure 18:
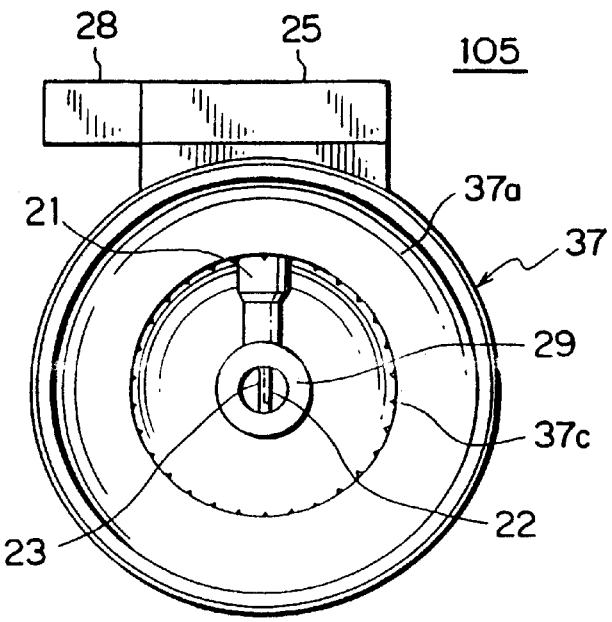
FIG. 18 is a front view illustrating a flow rate sensor made according to an eighth embodiment of the present invention.
Figure 19:
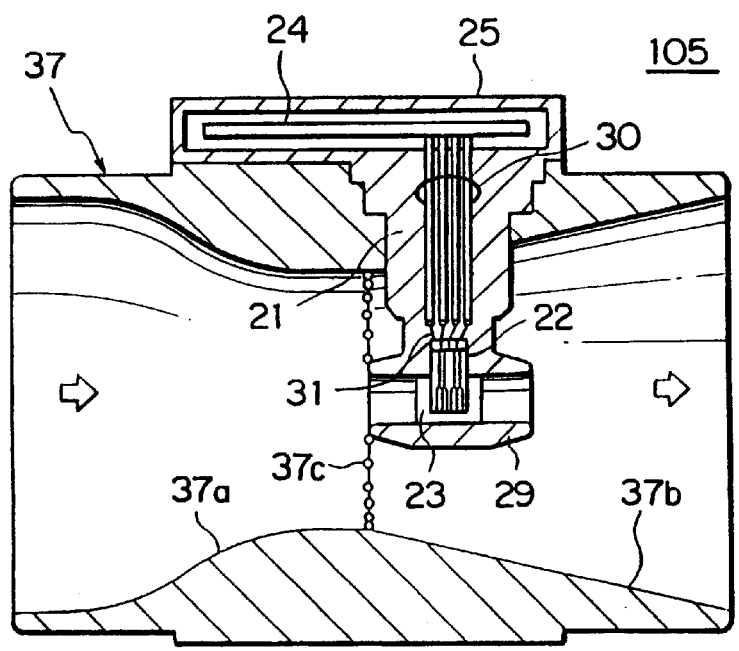
FIG. 19 is a sectional view in side elevation illustrating a flow rate sensor made according to the eighth embodiment of the present invention.
Figure 20:
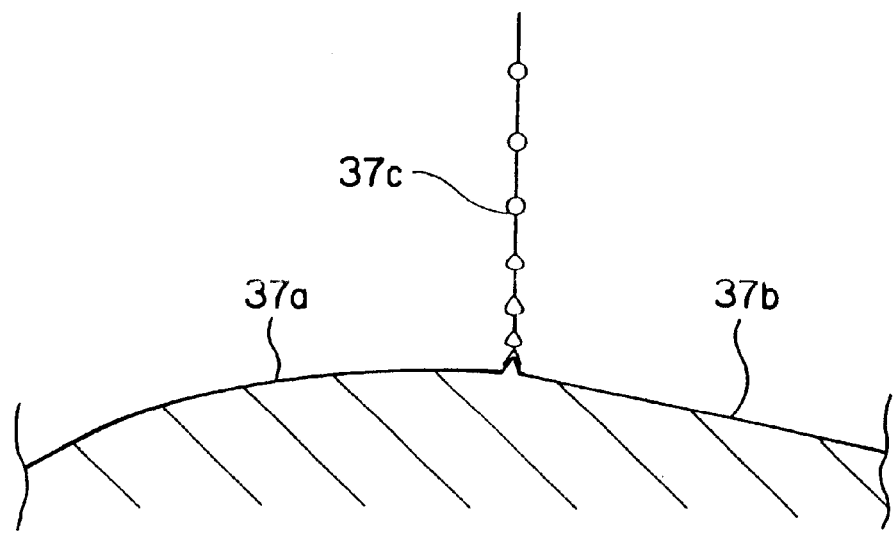
FIG. 20 is an enlarged cross sectional view illustrating an important portion of the flow rate sensor made according to the eighth embodiment of the present invention.

Referring to FIGS. 18 and 19, a thermo-sensitive type flow rate sensor 105 of the eighth embodiment is similar to that of the seventh embodiment except the following differences. Namely, a main fluid passage 37 is a cylindrical pipe through which flows a fluid whose flow rate is to be measured. The main fluid passage 37 has a converged section 37a whose passage cross sectional area gradually becomes smaller from a inlet thereof towards the downstream side. In practice, such a converged section 37a is formed by a three dimensional curved surface. Further, the main fluid passage 37 has an enlarged section 37b integrally connected with the converged section 37a, with its passage cross sectional area becoming gradually larger form the narrowest portion of the passage cross sectional area of the converged section 37a towards the downstream side thereof. Moreover, as shown in FIG. 20, a plurality of small projections 37c each having a conical shape, are arranged in an annular formation at an equal interval on the inner surface of the main fluid passage 37, on a position corresponding to a junction between the converged section 37a and the enlarged section 37b. Similarly, the detecting tubular member 29 is arranged in a manner such that its inlet is located in or at least close to a position corresponding to a narrowest portion of the converged section 36a.

In use of the flow rate sensor 105 of the eighth embodiment, a plurality of small projections 37c each having a conical shape, are arranged in an annular formation at an equal interval on the inner surface of the main fluid passage 37, on a position corresponding to a junction between the converged section 36a and the enlarged section 36b. Therefore, when a fluid (having passed through the converged section 36a) flows over the conical projections 37c, small eddy flows will occur, so that a fluid layer in contact with the inner surface of the enlarged section 37b will be disturbed. As a result, the wall frictional resistance on the inner surface of the enlarged section 37b will be reduced to a relatively small value, thereby inhibiting a large scale fluid cracking and reducing a pressure loss across the flow rate sensor.

In this way, with the use of the flow rate sensor made according to the eighth embodiment, it is allowed to obtain the same effect as in the seventh embodiment. Nevertheless, similar to the seventh embodiment of the present invention, in this eighth embodiment, if an m/r ratio (m: fluid average depth; r: a maximum height of the small projections 37c) is set in a range of about 25 to about 40, it is sure to obtain the same effect as in the seventh embodiment.

Embodiment 9

A ninth embodiment of the present invention will be described with reference to FIGS. 21, 22 and 23.

Figure 21:
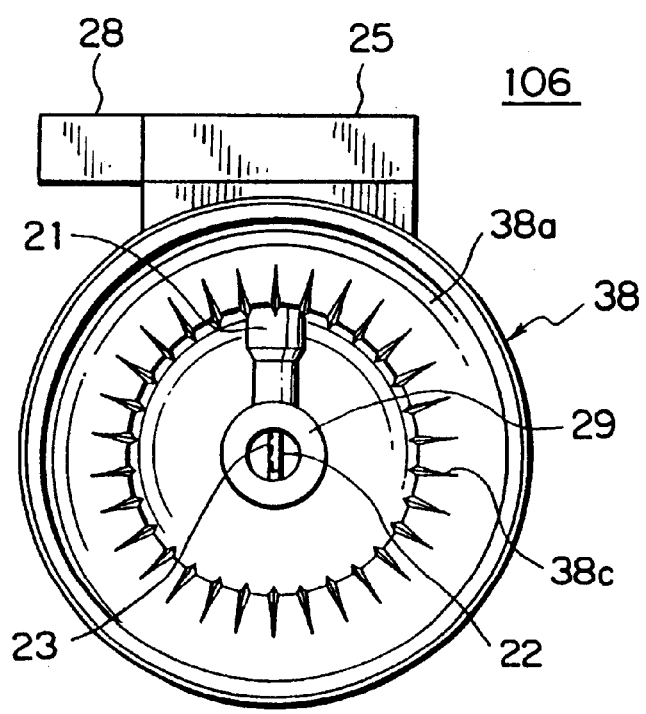
FIG. 21 is a front view illustrating a flow rate sensor made according to a ninth embodiment of the present invention.
Figure 22:
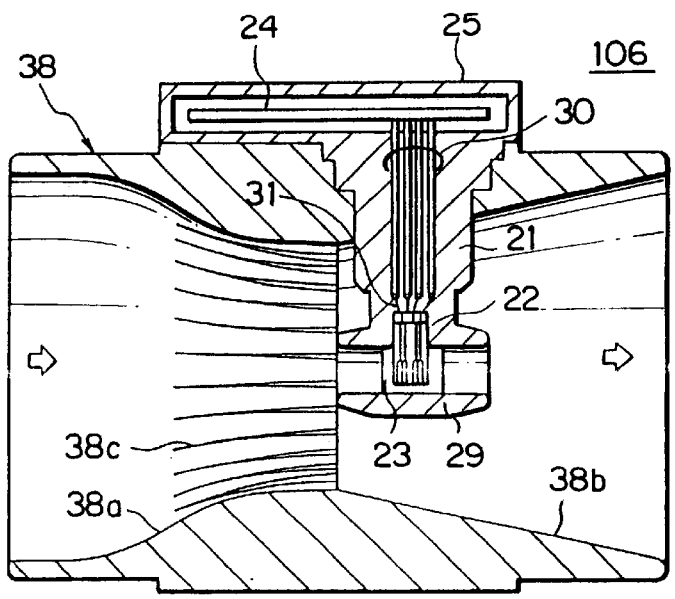
FIG. 22 is a sectional view in side elevation illustrating a flow rate sensor made according to the ninth embodiment of the present invention.

Referring to FIGS. 21 and 22, a thermo-sensitive type flow rate sensor 106 of the ninth embodiment is similar to that of the second embodiment except the following differences. Namely, a main fluid passage 38 is a cylindrical pipe through which flows a fluid whose flow rate is to be measured. The main fluid passage 38 has a converged section 38a whose passage cross sectional area gradually becomes smaller from a inlet thereof towards the downstream side. In practice, such a converged section 38a is formed by a three dimensional curved surface. Further, the main fluid passage 38 has a enlarged section 38b integrally connected with the converged section 38a, with its passage cross sectional area becoming gradually larger from the narrowest portion of the passage cross sectional area of the converged section 38a towards the downstream side thereof. Moreover, as shown in FIG. 23, a plurality of projections 38c are formed on the inner surface of the main fluid passage 38, In detail, the projections 38c are elongate sharp members arranged circumferentially at an equal interval on the inner surface of the converged section 38a close to the narrowest portion of the passage cross sectional area thereof. The longitudinal axis of the elongate sharp members are in parallel with that of the main fluid passage 38. In detail, each elongate sharp member has a triangular cross section, with the height thereof gradually becoming higher from the upstream side to the downstream side of the fluid passage. Similarly, the detecting tubular member 29 is arranged in a manner such that its inlet is located in or at least close to a position corresponding to a narrowest portion of the converged section 38a.

In the flow rate sensor 106 of the ninth embodiment, a plurality of sharp projections 38c are arranged circumferentially at an equal interval on the inner surface of the converged section 38a, on a position close to the narrowest portion of the passage cross sectional area thereof. In particular, each sharp projection 38c has a triangular cross section, with the height thereof gradually becoming higher from the upstream side to the downstream side of the fluid passage. Therefore, when a fluid (having passed through the converged section 38a) flows over the sharp projections 38c, some eddy flows will occur, so that a fluid layer in contact with the inner surface of the enlarged section 38b will be disturbed. As a result, the wall frictional resistance on the inner surface of the enlarged section 38b will be reduced to a relatively small value, thereby inhibiting a large scale fluid cracking and reducing a pressure loss across the flow rate sensor.

Figure 24:
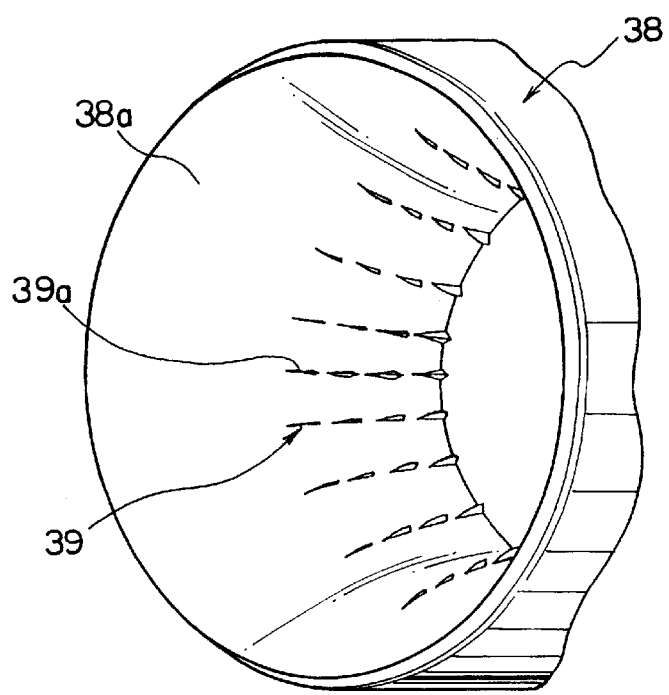
FIG. 24 is an enlarged perspective view illustrating an important portion of another flow rate sensor made according to the ninth embodiment of the present invention.
Figure 25:
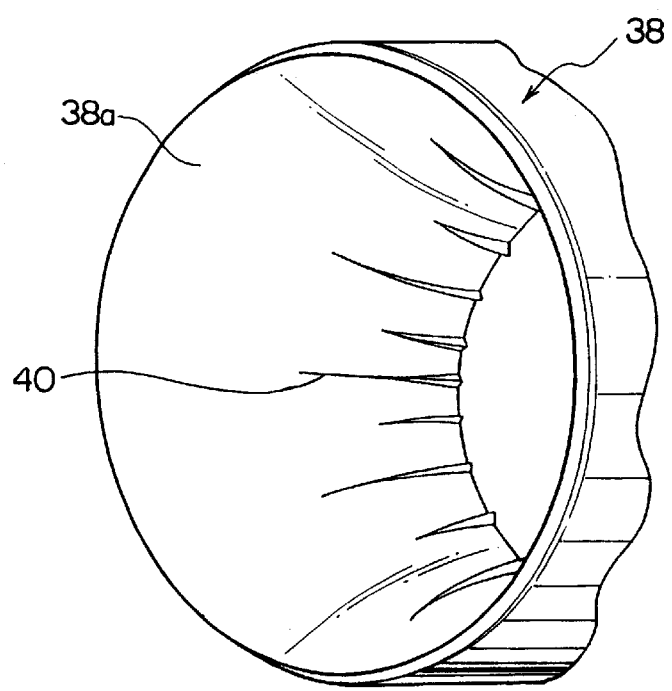
FIG. 25 is an enlarged perspective view illustrating an important portion of a further flow rate sensor made according to the ninth embodiment of the present invention.

FIGS. 24 and 25 are views schematically illustrating two modified examples of the ninth embodiment of the present invention.

Referring to FIG. 24, each sharp projection 39, which is arranged in the longitudinal direction of the main fluid passage 38, may include a plurality of smaller sharp projections 39a. Each smaller sharp projection 39a is so formed that its cross sectional height becomes gradually higher from the upstream side towards the downstream side of the fluid passage.

Referring to FIG. 25, a plurality of sharp projections 40, which are all arranged in the longitudinal direction of the main fluid passage 38, may have different lengths.

Figure 23:
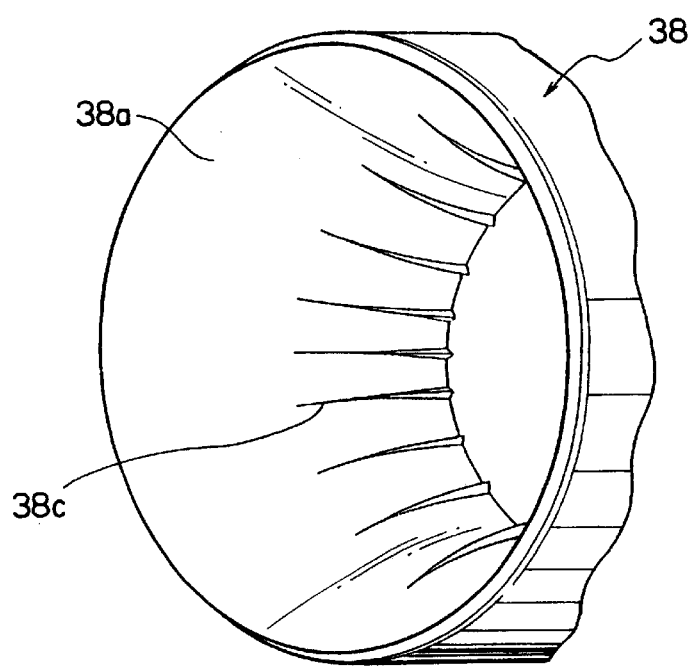
FIG. 23 is an enlarged perspective view illustrating an important portion of the flow rate sensor made according to the ninth embodiment of the present invention.

With the use of the sharp projections 39 or 40, some small eddy flows will occur in the main fluid when passing the converged section 38a, thereby obtaining the same effect as in the example shown in FIG. 23.

Nevertheless, in this ninth embodiment, if an m/r ratio (m: fluid average depth; r: a maximum height of each of the small projections 38c, 39, 40) is set in a range of about 25 to about 40, it is sure to reduce a pressure loss.

Embodiment 10

A tenth embodiment of the present invention will be described with reference to FIGS. 26 and 27.

Figure 26:
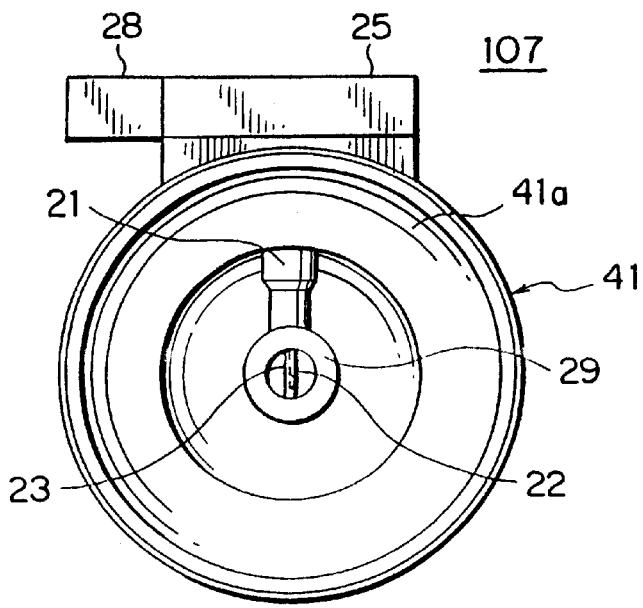
FIG. 26 is a front view illustrating a flow rate sensor made according to a tenth embodiment of the present invention.
Figure 27:
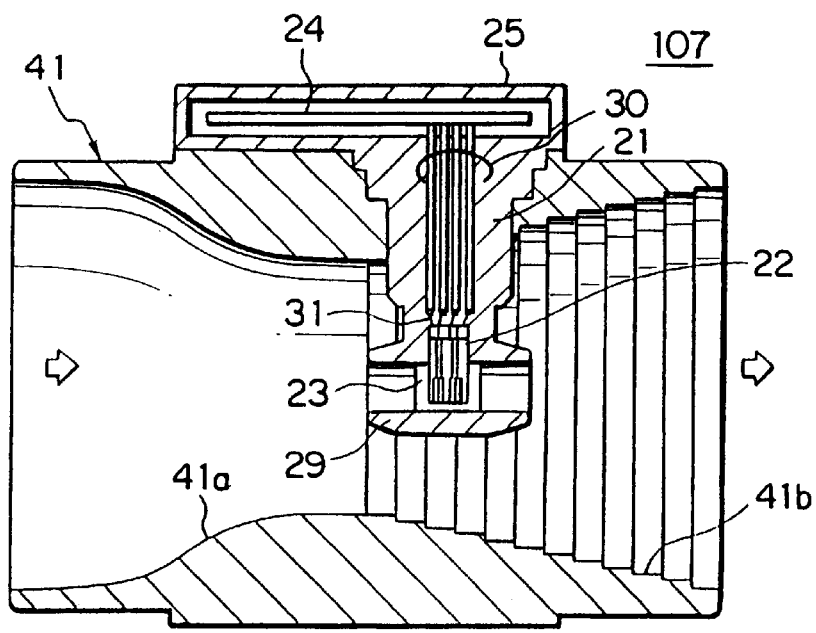
FIG. 27 is a sectional view in side elevation illustrating a flow rate sensor made according to the tenth embodiment of the present invention.

Referring to FIGS. 26 and 27, a thermo-sensitive type flow rate sensor 107 of the tenth embodiment is similar to that of the second embodiment except the following differences. Namely, a main fluid passage 41 is a cylindrical pipe through which flows a fluid whose flow rate is to be measured. The main fluid passage 41 has a converged section 41a whose passage cross sectional area gradually becomes smaller from a inlet thereof towards the downstream side. In fact, such a converged section 41a is formed by a three dimensional curved surface. Further, the main fluid passage 41 has a enlarged section 41b (with its inner surface formed into a stairway structure) connected with the converged section 41a, with its passage cross sectional area becoming gradually larger from the narrowest portion of the passage cross sectional area of the converged section 41a towards the downstream side thereof. In particular, an angle formed between the enlarged section 41b and the central axis of the main fluid passage 41 is 7 degrees or smaller. Similarly, the detecting pipe conduit 29 is arranged in a manner such that its inlet is located in or at least close to a position corresponding to the narrowest portion of the converged section 41a. Here, the inner wall of the enlarged section 41b has been formed into stairway structure, thus it has a scabrous surface.

In the flow rate sensor 107 of the tenth embodiment, since the enlarged section 41b is formed with its passage cross sectional area (for fluid flowing) becoming gradually larger in a stairway form towards the downstream side thereof, some small eddy flows will occur, so that a fluid layer in contact with the inner surface of the enlarged section 41b will be disturbed. As a result, the wall frictional resistance on the inner surface of the enlarged section 41b will be reduced to a relatively small value, thereby obtaining the same effect as in the sixth embodiment.

Further, such main fluid passage 41 may be formed by way of injection molding, so that it is possible to manufacture the fluid passage in a large quantity.

In addition, in this tenth embodiment of the present invention, if an m/r ratio (m: fluid average depth; r: a maximum height of the steps of the stairway-like inner surface of the enlarged section 41b corresponding to the narrowest portion of the main fluid passage 41) is maintained in a range of about 25 to about 40, it is sure to obtain the same effect as in the sixth embodiment, thereby minimizing a pressure loss.

Embodiment 11

An eleventh embodiment of the present invention will be described with reference to FIGS. 28 and 29.

Figure 28:
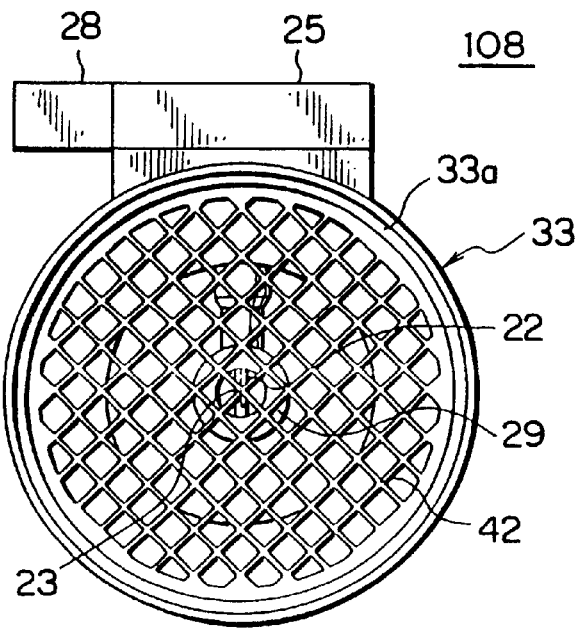
FIG. 28 is a front view illustrating a flow rate sensor made according to an eleventh embodiment of the present invention.
Figure 29:
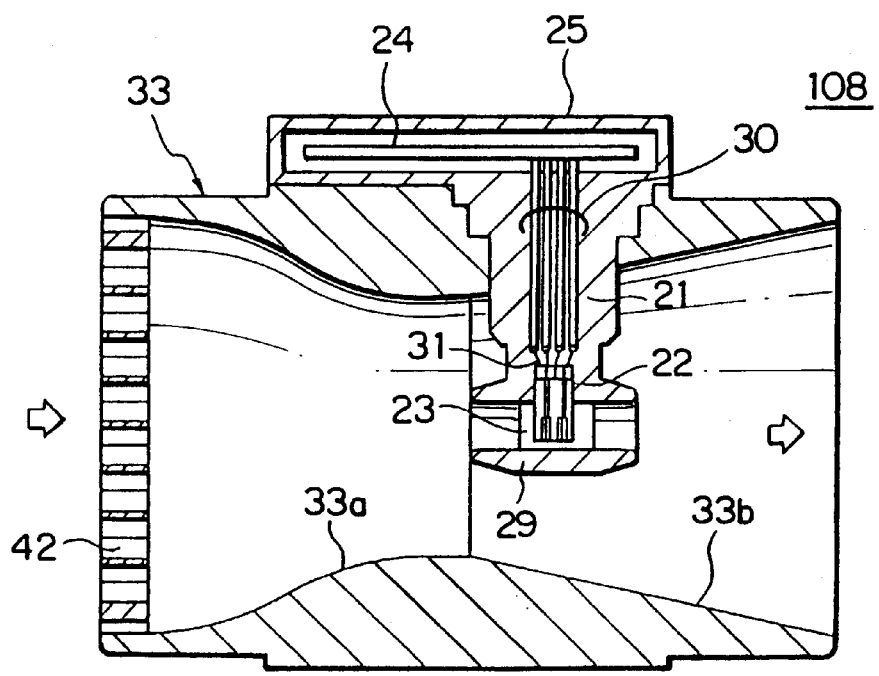
FIG. 29 is a sectional view in side elevation illustrating a flow rate sensor made according to the eleventh embodiment of the present invention.

Referring to FIGS. 28 and 29, a thermo-sensitive type flow rate sensor 108 of the eleventh embodiment is similar to that of the second embodiment except that a fluid rectifying grating means 42 is disposed at the inlet side of the main fluid passage 33.

In the flow rate sensor 108 made according to the eleventh embodiment of the present invention, as shown in FIG. 29, the main fluid passage 33 has a converged section 33a whose passage cross sectional area gradually becomes smaller from a inlet thereof towards the downstream side. In fact, such a converged section 33a is formed by a three dimensional curved surface. Further, a fluid rectifying grating means 42 is disposed at the inlet side of the main fluid passage 33. Accordingly, there will not occur any dead fluid portion in the converged section 33a, since the fluid at this time has already been rectified by the fluid rectifying grating means. In this way, it is possible not only to obtain an effect of inhibiting the formation of circling flows (owing to the fluid rectifying grating means 42), but also to rectify a flow speed distribution in the direction of the main fluid axis by virtue of the converged section 33a. Thus, it is sure to inhibit some possible errors in flow rate detection, even if there is a change in the flow speed distribution of a fluid on the upstream side of the flow rate sensor 108.

Embodiment 12

A twelfth embodiment of the present invention will be described with reference to FIGS. 30 and 31.

Figure 30:
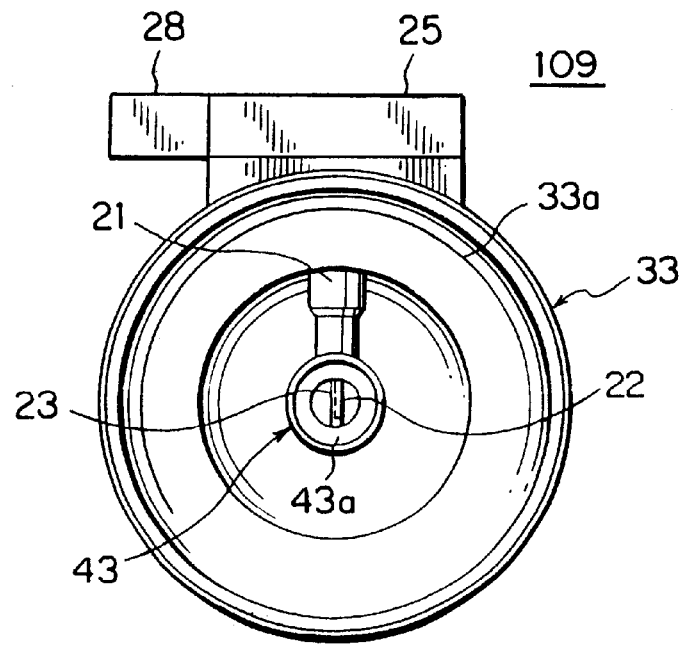
FIG. 30 is a front view illustrating a flow rate sensor made according to a twelfth embodiment of the present invention.
Figure 31:
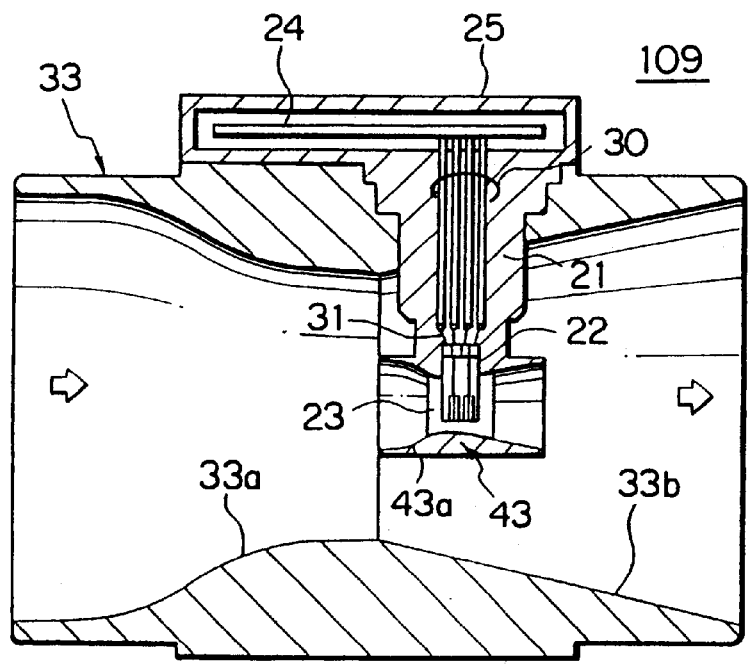
FIG. 31 is a sectional view in side elevation illustrating a flow rate sensor made according to the twelfth embodiment of the present invention.
Figure 32:
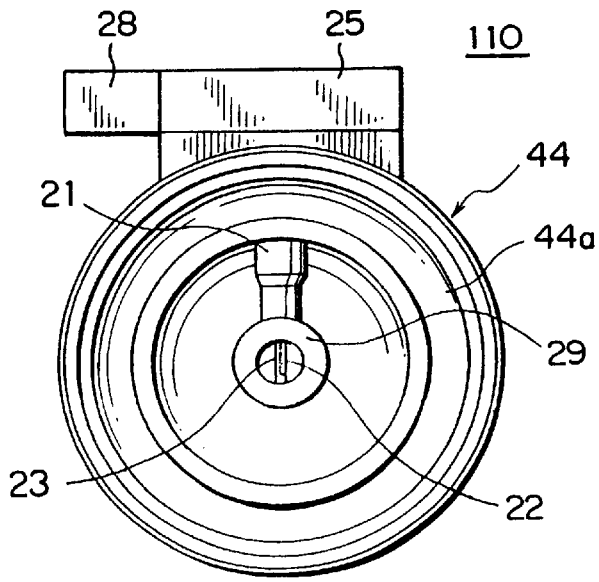
FIG. 32 is a front view illustrating a flow rate sensor made according to a thirteenth embodiment of the present invention.
Figure 33:
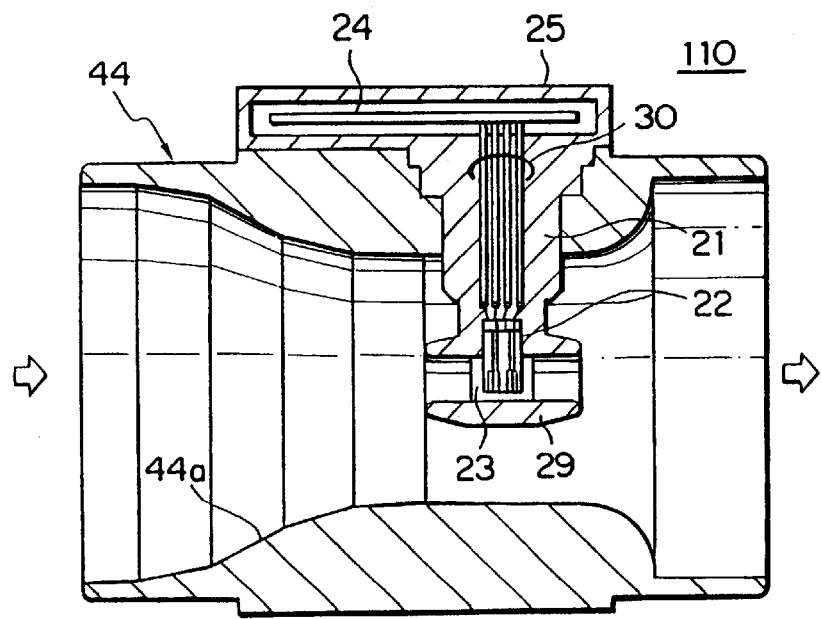
FIG. 33 is a sectional view in side elevation illustrating a flow rate sensor made according to the thirteenth embodiment of the present invention.

Referring to FIGS. 30 and 31, a thermo-sensitive type flow rate sensor 109 of the twelfth embodiment is similar to that of the second embodiment except the following differences. Namely, a detecting pipe conduit 43 is a cylindrical pipe through which flows a fluid whose flow rate is to be measured. The detecting pipe conduit 43 has a converged section 43a whose passage cross sectional area gradually becomes smaller from a inlet thereof towards the downstream side. In fact, such a converged section 43a is formed by a three dimensional curved surface. Further, a flow rate detecting element 22 is positioned in a position corresponding to a narrowest portion of the passage cross sectional area of the converged section 43a.

With the use of the flow rate sensor 109, after a fluid involving different velocity portions has flowed into the detecting pipe conduit 43, the flowing speed of the fluid will be increased when passing through the converged section 43a, with a dynamic pressure gradually increasing and a static pressure gradually decreasing. Consequently, fluid components flowing in a direction perpendicular to the fluid main axis will be reduced, since most of them are converted into fluid components flowing in the fluid main axis direction, thereby obtaining a uniform speed distribution of the fluid flowing in the main axis direction. Thus, the fluid, whose speed distribution has been rectified in the fluid main axis direction by the converged section 43a, will arrive at the flow rate detecting element 22. Further, since the converged section 43a is formed by a three dimensional curved surface and since such converged section 43a does not involve any shouldered portions or protrudingly cornered portions, a change rate of the curvature of the curved surface forming the converged section 43a is small. As a result, since the curved surface forming the converged section 43a has a gentle and continuously inclined surface, it is sure to avoid a phenomenon of eddy flow or a fluid cracking which is responsible for fluid noise. Thus, as compared with a conventional flow rate sensor involving the use of a Venturi type detecting member, the flow rate sensor 109 of the present embodiment is remarkably capable of effectively reducing a fluid noise, accelerating the fluid so as to lead the fluid to the flow rate detecting element 22, thereby permitting a desired flow rate measurement with an improved precision.

Further, with the flow rate sensor 109 made according to the twelfth embodiment of the present invention, it is also possible that an enlarged section may be formed in connection with the narrowest portion of the passage cross sectional area of the converged section 43a. Such enlarged section is so formed that its passage cross sectional area becomes gradually larger towards the downstream side thereof. In this manner, it is possible that a dynamic pressure obtained in the converged section 43a may be gradually converted into a static pressure in the enlarged section, thereby reducing a pressure loss.

Although it has been described in the present embodiment that the converged section 43a is formed by a three dimensional curved surface, it is also possible that the converged section may be formed by both a three dimensional curved surface and a straight plane surface.

Embodiment 13

Although it has been described in the first embodiment that a converged section may be formed by a three dimensional curved surface, in a thirteenth embodiment of the present invention it is also possible that a converged section 44a may be formed by connecting a plurality of straight plane surfaces so as to approximately form a three dimensional curved surface.

Other sections of the flow rate sensor 110 made according to the thirteenth embodiment of the present invention, are the same as those in the first embodiment.

Thus, in the flow rate sensor 110 of the thirteenth embodiment, since the converged section 44a is formed by a generally three dimensional curved surface, such a converged section 44a is substantially the same as the converged section 26a of the first embodiment, thereby obtaining an effect which is the same as that obtained in the first embodiment.

Embodiment 14

Figure 34:
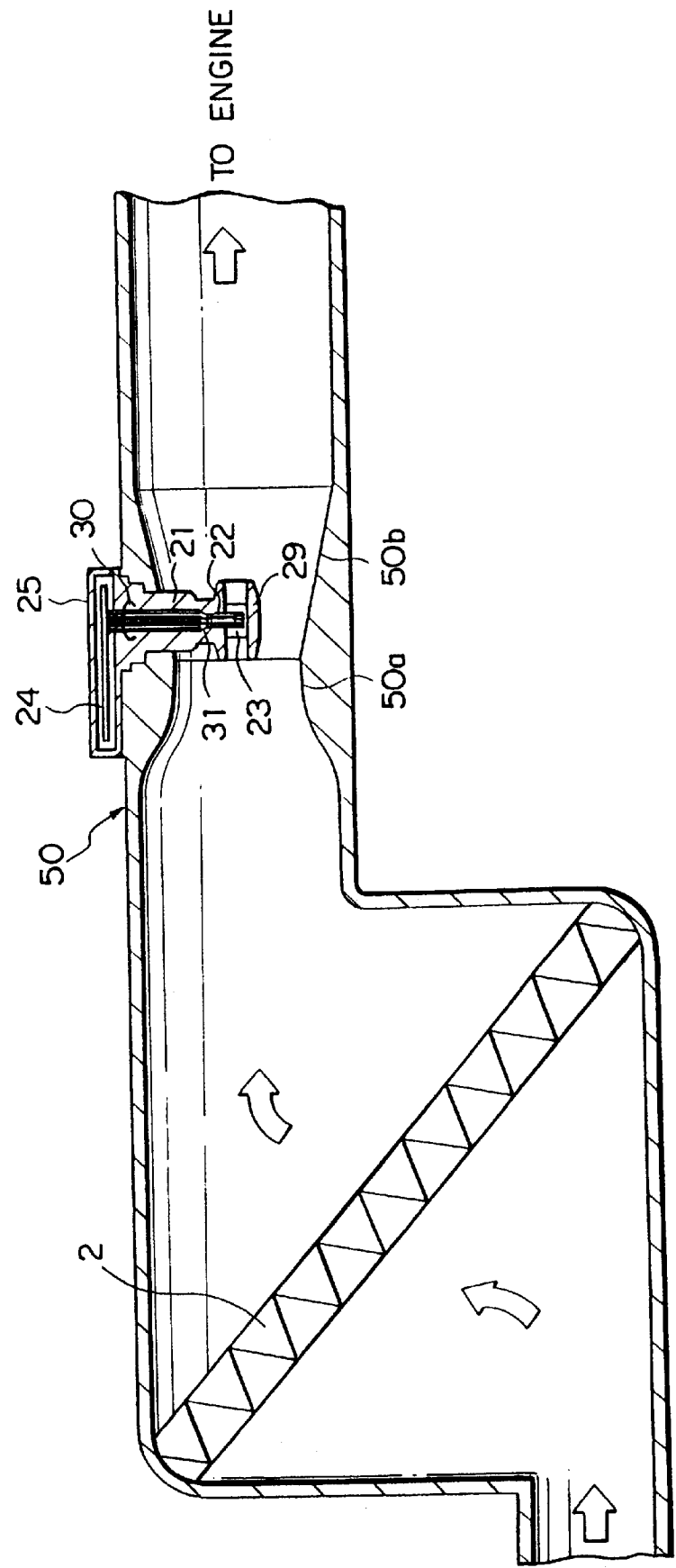
FIG. 34 is a sectional view in side elevation illustrating a flow rate sensor made according to a fourteenth embodiment of the present invention.

FIG. 34 is a sectional view in side elevation schematically illustrating a flow rate sensor made according to a fourteenth embodiment of the present invention.

In this fourteenth embodiment, a flow rate sensor has been plugged into a main fluid passage 50 which is one with an air cleaner case.

Here, the main fluid passage 50 is an intake air pipe for an automobile engine, an air cleaner element 2 is disposed within the main fluid passage 50. In detail, the main fluid passage 50 has, on the downstream side of the air cleaner element 2, a converged section 50a whose passage cross sectional area gradually becomes smaller towards the downstream side. In fact, such a converged section 50a is formed by a three dimensional curved surface. Further, the main fluid passage 50 has an enlarged section 50b which is integrally connected with the converged section 50a, with its passage cross sectional area becoming gradually larger from the narrowest portion of the passage cross sectional area of the converged section 50a towards the downstream side thereof. Moreover, a detecting pipe conduit 29 equipped with a flow rate detecting element 22, is held by a support section 21 in the main fluid passage 50, in a manner such that it forms a coaxial relation with the main fluid passage 50. Similarly, the detecting pipe conduit 29 is arranged in a manner such that its inlet is located in or at least close to a position corresponding to the narrowest portion of the passage cross sectional area of the converged section 50a.

Thus, in the fourteenth embodiment of the present invention, an intake air flowing in the main fluid passage 50, is passed through the air cleaner element 2 so as to remove the dust therefrom. Then, the air flow is caused to flow continuously towards an automobile engine. Thus, as soon as the fluid has flowed into the converged section 50a, the flowing speed of the fluid will be increased when passing through the converged section 50a, with a dynamic pressure gradually increasing and a static pressure gradually decreasing. Consequently, fluid components flowing in a direction perpendicular to the fluid main axis will be reduced, since most of them are converted into fluid components flowing in the fluid main axis direction, thereby obtaining a uniform speed distribution for the fluid flowing in the main axis direction. Thus, the fluid, whose speed distribution has been rectified in the fluid main axis direction by the converged section 50a, will flow into the detecting pipe conduit 29 and arrive at the flow rate detecting element 22.

On the other hand, the air flow, having passed through the narrowest portion of the passage cross sectional area of the converged section 50a, flows through the enlarged section 50b, with the dynamic pressure decreased and the static pressure increased. Namely, a dynamic pressure obtained in the converged section 50a is gradually converted into a static pressure in the enlarged section 50b, thereby forming a uniform static pressure and thus reducing a pressure loss.

Thus, by using the flow rate sensor of the fourteenth embodiment, even if an intake air flow contains different velocity portions caused due to a blockage of the air cleaner element 2, and even if there is a considerable change in speed distribution of the intake air flow, the intake air flow may be rectified by virtue of the converged section 50a, thereby obtaining a uniform speed distribution for the air flow before its arrival at the flow rate detecting element 22. In this way, it is sure to reduce any signal disturbance which is possibly contained in a final flow rate detecting result.

Further, since a dynamic pressure obtained in the converged section 50a is gradually converted into a static pressure in the enlarged section 50b, a pressure loss across the flow rate sensor may be reduced, thereby ensuring a sufficient amount of an intake air to be supplied to the automobile engine and thus ensuring a sufficient power output of the engine.

Figure 35:
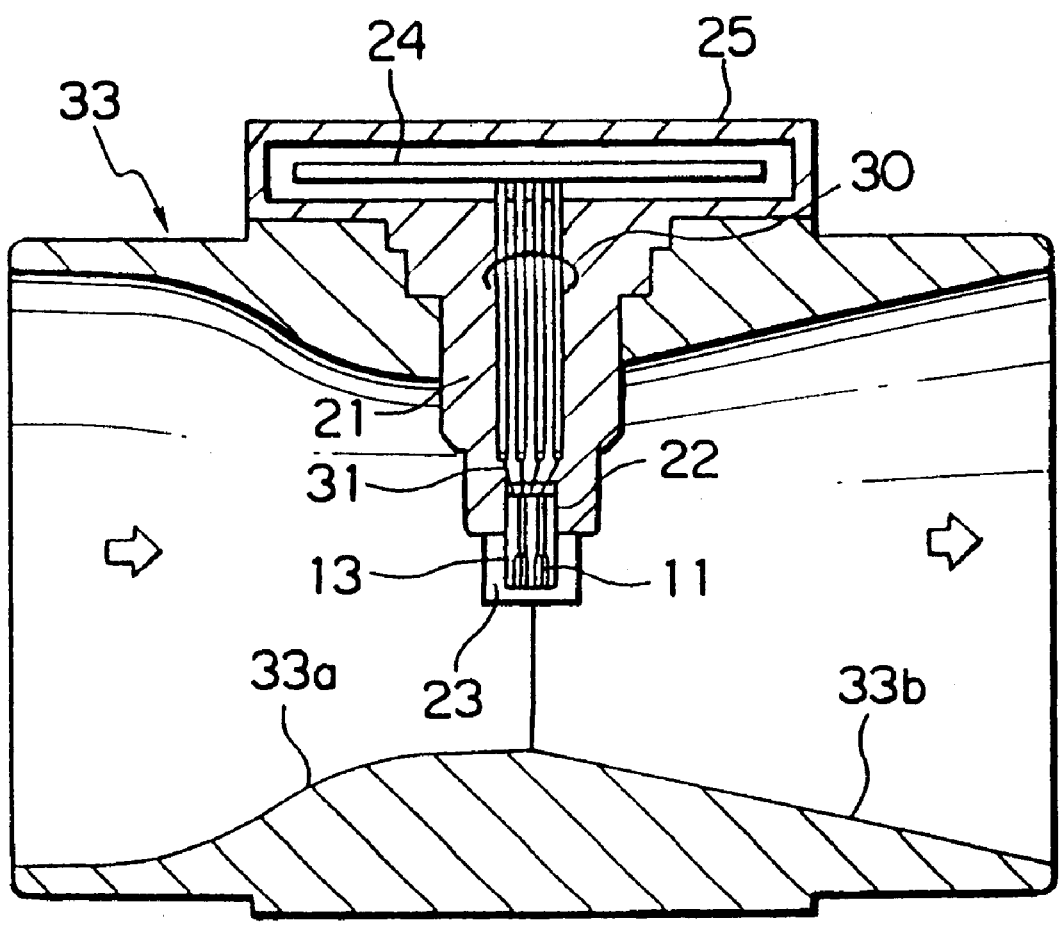
FIG. 35 is a sectional view in side elevation illustrating another flow rate sensor made according to the present invention.
Figure 36:
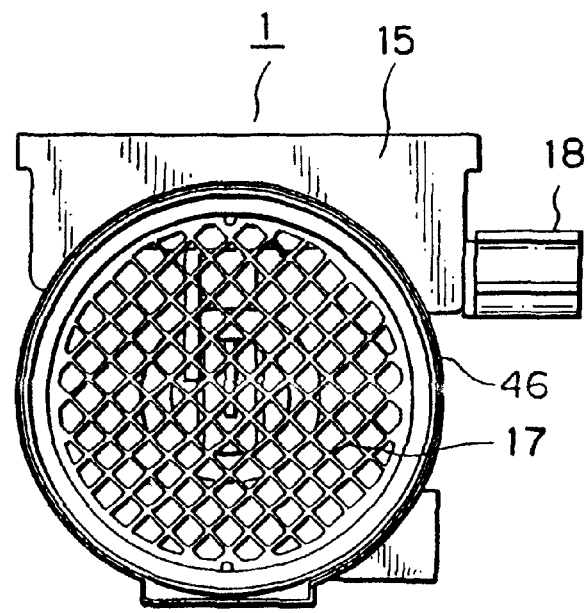
FIG. 36 is a front view illustrating a flow rate sensor made according to a prior art.
Figure 37:
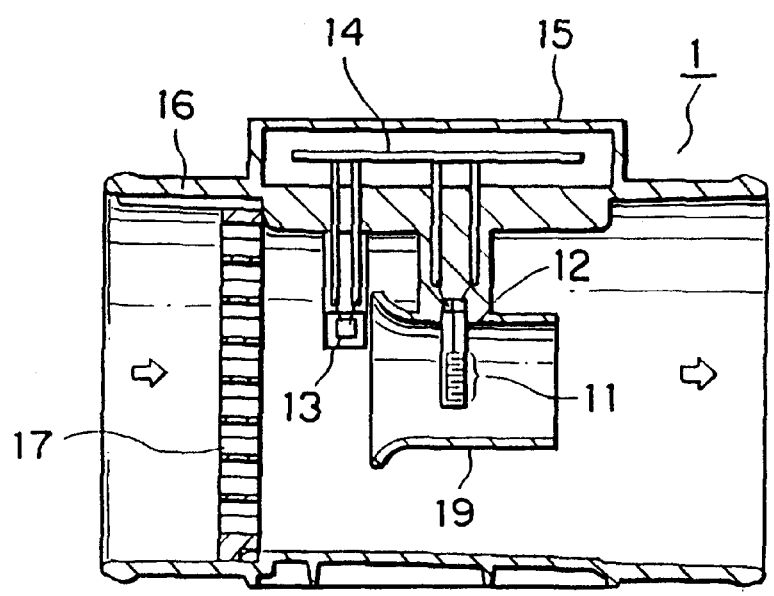
FIG. 37 is a sectional view in side elevation illustrating the flow rate sensor of FIG. 36.
Figure 38:
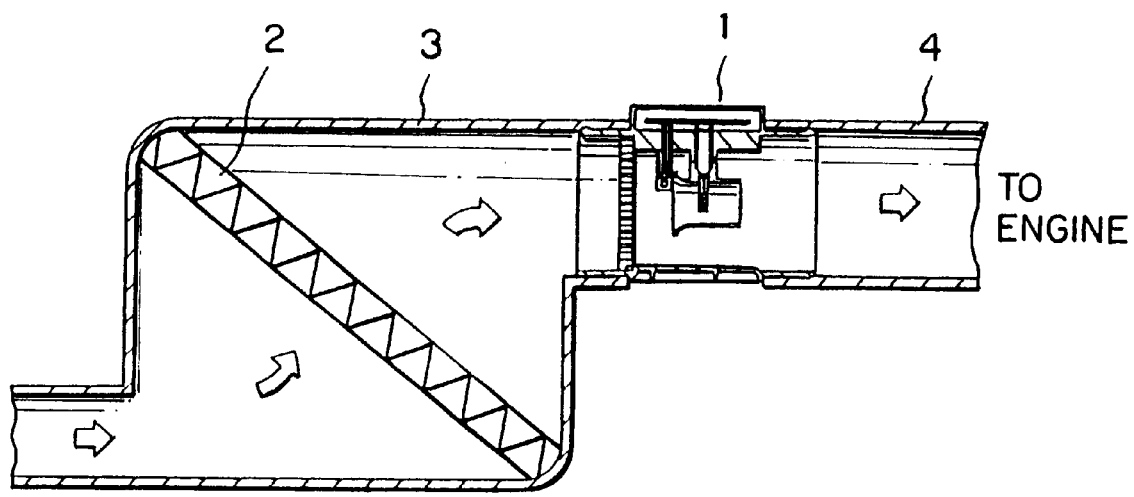
FIG. 38 is a sectional view in side elevation illustrating an intake pipe system for use with an automobile engine.
Figure 39:
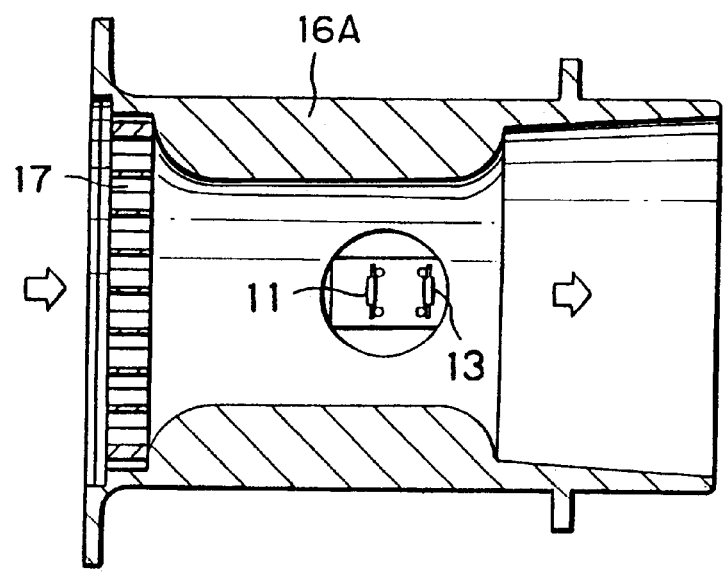
FIG. 39 is a sectional view in side elevation illustrating another flow rate sensor made according to a prior art.

Although it has been described in the above embodiments 1–14 that a detecting pipe conduit containing a flow rate detecting element is disposed in the main fluid passage, it is also possible that the flow rate detecting element does not have to be contained in the detecting pipe conduit, instead the flow rate detecting element may be directly disposed in the main fluid passage as shown in FIG. 35.

With the use of the present invention which has been constituted in the above-described manner, it is possible to provide at least the following effects.

According to the present invention, an improved flow rate sensor comprises: a main fluid passage for a fluid to flow therealong; a temperature sensing element for sensing the temperature of the fluid; a flow rate detecting element including a flow rate detecting resistance made of a thermosensitive electrically resistant material, the flow rate detecting element being disposed in the main fluid passage in a manner such that the flow rate detecting resistance is exposed to the fluid flowing therethrough; and a control circuit for controlling an electric current flowing to the flow rate detecting resistance such that the temperature of the flow rate detecting resistance may be maintained at a predetermined value which is higher to some extent than a fluid temperature detected by the temperature sensing element. Here, the flow rate of the fluid flowing along the main fluid passage is measured on the basis of a heat transfer phenomenon from the above flow rate detecting resistance to the fluid. The flow rate sensor of the present invention is characterized in that: the main fluid passage involves a converged section whose passage cross sectional area becomes gradually smaller towards the downstream side thereof; at least one portion of the inner surface of the converged section cut by a plane containing the central axis of the main fluid passage is formed by a generally three dimensional curved surface; and the flow rate detecting element is disposed in a direction in which the fluid flows, at a position close to the narrowest portion of the passage cross sectional area of the converged section. Therefore, even if there is a change in the speed distribution of a flowing fluid whose flow rate is to be detected, it is still possible to perform a desired flow rate detection with a high precision, and at the same time to reduce a pressure loss.

Further, according to the present invention, an improved flow rate sensor comprises: a main fluid passage for a fluid to flow therealong; a detecting pipe conduit coaxially disposed in the main fluid passage; a temperature sensing element for sensing the temperature of the fluid; a flow rate detecting element including a flow rate detecting resistance made of a thermo-sensitive electrically resistant material, the flow rate detecting element being disposed in the detecting pipe conduit in a manner such that the flow rate detecting resistance is exposed to the fluid flowing therethrough; and a control circuit for controlling an electric current flowing to the flow rate detecting resistance such that the temperature of the flow rate detecting resistance may be maintained at a predetermined value which is higher to some extent than a fluid temperature detected by the temperature sensing element. Here, the flow rate of the fluid flowing along the main fluid passage is measured on the basis of a heat transfer phenomenon from the above flow rate detecting resistance to the fluid. The flow rate sensor of the present invention is characterized in that: the main fluid passage involves a converged section whose passage cross sectional area becomes gradually smaller towards the downstream side thereof, at least one portion of an inner surface of the converged section cut by a plane containing the central axis of the main fluid passage is formed by a generally three dimensional curved surface; and the inlet of the detecting pipe conduit is disposed in a direction in which the fluid flows, in a manner such that the inlet is at a position close to the narrowest portion of the passage cross sectional area of the converged section. Accordingly, even if there is a change in the speed distribution of a flowing fluid whose flow rate is to be detected, it is still possible to perform a desired flow rate detection with a high precision, and at the same time to reduce a pressure loss.

Further, in the flow rate sensor of the present invention, the main fluid passage consists of a pipe having a predetermined length in a direction in which the fluid flows, the converged section is so formed that its passage cross sectional area becomes gradually smaller from the inlet of the pipe towards a downstream side along the fluid flowing direction. Moreover, the inlet of the detecting pipe conduit is disposed at a position in a direction in which the fluid flows, the position being apart from the inlet of the main fluid passage at a distance that is in a range from about 0.75 L to about 1.5 L; L is a distance between the inlet of the main fluid passage and the narrowest portion of the passage cross sectional area of the converged section. Therefore, even if there is a change in the speed distribution of a flowing fluid whose flow rate is to be detected, it is still possible to perform a desired flow rate detection with a high precision, and at the same time to reduce a pressure loss.

Further, in the flow rate sensor of the present invention, the converged section of the main fluid passage is so formed that a converging ratio $S_1/S_0$ satisfies an equation $1.5 \leq S_1/S_0 \leq 3.0$; $S_1$ is the passage cross sectional area of the largest portion of the converged section and $S_0$ is the passage cross sectional area of the narrowest portion of the converged section. Therefore, even if there is a change in the speed distribution of a flowing fluid whose flow rate is to be detected, it is still possible to perform a desired flow rate detection with only a reduced error, and at the same time to reduce a pressure loss.

Further, in the flow rate sensor of the present invention, the main fluid passage has an enlarged section integrally connected with the narrowest portion of the passage cross sectional area of the converged section, with its passage cross sectional area becoming gradually larger from the narrowest portion of the passage cross sectional area of the converged section towards the downstream side. Therefore, it is sure to prohibit the formation of eddy flows which will cause fluid cracking on the inner surface of the enlarged section, and sure to reduce a pressure loss.

Further, in the flow rate sensor of the present invention, the inner wall of the converged section and the inner wall of the enlarged section have been integrally formed together so as to present a continuous curved surface which is geometrically symmetrical, with the narrowest portion of the passage cross sectional area of the converged section serving as a geometric center. Therefore, it is sure to detect the flow rate of a fluid flowing in either direction with a high precision.

Further, in the flow rate sensor of the present invention, since the inner surface of the enlarged section is formed into scabrous surface, a lot of small eddy flows will occur on the inner surface of the enlarged section, and there will be some turbulence flows happening in a fluid layer in contact with the inner surface, thereby reducing a wall frictional resistance on the the surface to a relatively small value and thus reducing a pressure loss.

Further, in the flow rate sensor of the present invention, since a plurality of small projections are formed on the inner surface of the enlarged section, a lot of small eddy flows will occur on the inner surface of the enlarged section, and there will be some turbulence flows happening in a fluid layer in contact with the inner surface, thereby reducing a wall frictional resistance on the surface to a relatively small value and thus reducing a pressure loss.

Further, in the flow rate sensor of the present invention, an m/r ratio is set in a range of about 25 to about 40; m is a fluid average depth defined as a ratio of (passage cross sectional area of the main fluid passage corresponding to the narrowest portion thereof)/(circumferential length of a passage cross section of the main fluid passage corresponding to the narrowest portion thereof) and r is a maximum height of projections formed on the inner surface of the enlarged section close to the narrowest portion of the main fluid passage. Therefore, a lot of small eddy flows will occur on the inner surface of the narrowest portion of the main fluid passage, and this will promote some turbulence flows happening in a fluid layer in contact with the inner surface, thereby reducing a frictional resistance on the the surface to a relatively small value and thus minimizing a pressure loss.

Further, in the flow rate sensor of the present invention, since the inner surface of the enlarged section has a stairway-like surface, a lot of small eddy flows will occur on the inner surface of the enlarged section, and there will be some turbulence flows happening in a fluid layer in contact with the inner surface, thereby reducing a frictional resistance on the the surface to a relatively small value and thus reducing a pressure loss.

Further, in the flow rate sensor of the present invention, an m/r ratio is maintained in a range of about 25 to about 40; m is a fluid average depth defined as a ratio of (passage cross sectional area of the main fluid passage corresponding to the narrowest portion thereof)/(circumferential length of a passage cross section of the main fluid passage corresponding to the narrowest portion thereof) and r is a maximum height of the steps of the stairway-like inner surface of the enlarged section, close to the narrowest portion of the main fluid passage. Therefore, a lot of small eddy flows will occur on the inner surface of the narrowest portion of the main fluid passage, and this will promote some turbulence flows happening in a fluid layer in contact with the inner surface, thereby reducing a wall frictional resistance on the inner surface to a relatively small value and thus minimizing a pressure loss.

Further, in the flow rate sensor of the present invention, since the inner surface of the converged section is continuously and integrally connected with that of the enlarged section, it is allowed to form only a small change rate of the curvature of the curved surface forming the inner surface of the main fluid passage, thereby making it possible to inhibit the formation of eddy flows which are responsible for fluid flowing noise, thus prohibiting fluid cracking and reducing a pressure loss.

Further, in the flow rate sensor of the present invention, since a plurality of projections are formed on the inner surface of the converged section close to the narrowest portion thereof, a lot of small eddy flows will occur on the inner surface of the narrowest portion of the main fluid passage, and this will promote some turbulence flows happening in a fluid layer in contact with the inner surface, thereby reducing a frictional resistance on the the surface to a relatively small value.

Further, in the flow rate sensor of the present invention, the above projections are elongate sharp members arranged circumferentially at an equal interval on the inner surface of the converged section close to the narrowest portion thereof, the longitudinal axes of the elongate sharp members being in parallel with that of the main fluid passage, each elongate sharp member having a triangular cross section, with the height thereof gradually becoming higher from the upstream side to the downstream side. Therefore, some fine eddy flows will gradually occur on the inner surface of the converged section, and there will be some turbulence flows happening in a fluid layer in contact with the inner surface, thereby reducing a frictional resistance on the the surface to a relatively small value.

Further, in the flow rate sensor of the present invention, an m/r ratio is set in a range of about 25 to about 40; m is a fluid average depth defined as a ratio of (passage cross sectional area of the main fluid passage corresponding to the narrowest portion thereof)/(circumferential length of the passage cross section of the main fluid passage corresponding to the narrowest portion thereof) and r is a maximum height of the projections formed on the inner surface of the converged section close to the narrowest portion thereof. Therefore, a lot of small eddy flows will occur on the inner surface of the narrowest portion of the main fluid passage, and this will promote some turbulent flows happening in a fluid layer in contact with the inner surface, thereby minimizing a pressure loss.

Further, in the flow rate sensor of the present invention, since on the upstream side of the converged section is provided a fluid rectifying grating means, it is allowed not only to obtain an effect of inhibiting the formation of circling flow components in a fluid flowing into the fluid rectifying grating means, but also to obtain an effect of rectifying different velocity portions of a fluid flowing in a direction of the main fluid axis.

Further, according to the present invention, an improved flow rate sensor comprises: a main fluid passage for a fluid to flow therealong; a detecting pipe conduit coaxially disposed in the main fluid passage; a temperature sensing element for sensing the temperature of the fluid; a flow rate detecting element including a flow rate detecting resistance made of a thermo-sensitive electrically resistant material, the flow rate detecting element being disposed in the detecting pipe conduit in a manner such that the flow rate detecting resistance is exposed to the fluid flowing therethrough; and a control circuit for controlling an electric current flowing to the flow rate detecting resistance such that the temperature of the flow rate detecting resistance may be maintained at a predetermined value which is higher to some extent than a fluid temperature detected by the temperature sensing element. Here, the flow rate of the fluid flowing along the main fluid passage is measured on the basis of a heat transfer phenomenon from the above flow rate detecting resistance to the fluid. The flow rate sensor of the present invention is characterized in that: the detecting pipe conduit involves a converged section whose passage cross sectional area becomes gradually smaller towards the downstream side thereof; at least one portion of an inner surface of the converged section cut by a plane containing the central axis of the main fluid passage is formed by a generally three dimensional curved surface; and the flow rate detecting element is disposed in a direction in which the fluid flows, at a position close to the narrowest portion of the passage cross sectional area of the converged section. Therefore, even if there is a change in the speed distribution of a flowing fluid whose flow rate is to be detected, it is still possible to perform a desired flow rate detection with a high precision, and at the same time to reduce a pressure loss.

What is claimed is:

1. A flow rate sensor comprising:
    a main fluid passage for accommodating a fluid flow that travels in a flow direction from an upstream end of said main fluid passage to a downstream end of said main fluid passage, said main fluid passage having a central axis;
    a temperature sensing element provided in said main fluid passage for sensing a fluid flow temperature;
    a flow rate detecting element including a flow rate detecting resistance made of a thermo-sensitive electrically resistant material, said flow rate detecting element disposed in said main fluid passage and exposed to said fluid flow; and
    a control circuit for controlling an electric current flowing to said flow rate detecting resistance such that a temperature of said flow rate detecting resistance is maintained higher than said fluid flow temperature detected by said temperature sensing element;
    a flow rate of said fluid flow through said main fluid passage measured via a heat transfer phenomenon from said flow rate detecting resistance to said fluid flow;
    wherein said main fluid passage includes a converged section in which transverse cross sections taken (1) perpendicular to said central axis, and (2) consecutively in said flow direction have respectively decreasing areas;
    wherein an inner surface of said converged section has a curved profile in a longitudinal cross section taken parallel to said central axis; and
    wherein said flow rate detecting element is disposed on said central axis of said main fluid passage and inside said converged section.

2. A flow rate sensor comprising:
    a main fluid passage for accommodating a fluid flow that travels in a flow direction from an upstream end of said main fluid passage to a downstream end of said main fluid passage, said main fluid passage having a central axis;

a detecting pipe conduit coaxially disposed in said main fluid passage;

a temperature sensing element provided in said main fluid passage for sensing a fluid flow temperature;

a flow rate detecting element including a flow rate detecting resistance made of a thermo-sensitive electrically resistant material, said flow rate detecting element disposed in said detecting pipe conduit and exposed to said fluid flow; and a control circuit for controlling an electric current flowing to said flow rate detecting resistance such that a temperature of said flow rate detecting resistance is maintained higher than said fluid flow temperature detected by said temperature sensing element;

a flow rate of said fluid flow through said main fluid passage measured via a heat transfer phenomenon from said flow rate detecting resistance to said fluid flow;

wherein said main fluid passage includes a converged section in which transverse cross sections taken (1) perpendicular to said central axis, and (2) consecutively in said flow direction have respectively decreasing areas;

wherein an inner surface of said converged section has a curved profile in a longitudinal cross section taken parallel to said central axis; and wherein an inlet of said detecting pipe conduit is disposed inside said converged section.

3. The flow rate sensor according to claim 2, wherein said inlet of said detecting pipe conduit is spaced apart from said upstream end of said main fluid passage at a distance that is in a range from about 0.75 L to about 1.5 L;

wherein L is a distance between (1) said upstream end of said main fluid passage and (2) a point where an area of said transverse cross section of said converged section is at a minimum.

4. The flow rate sensor according to claim 2, wherein said converged section of said main fluid passage has a converging ratio $S_1/S_0$ that satisfies an equation $1.5 \leq S_1/S_0 \leq 3.0$;

wherein $S_1$ is a maximum area of said transverse cross sections of said converged section, and $S_0$ is a minimum area of said transverse cross sections of said converged section.

5. The flow rate sensor according to claim 2, wherein said main fluid passage has an enlarged section extending from a downstream end portion of said converged section to said downstream end of said main fluid passage, said enlarged section constructed such that transverse cross sections taken (1) perpendicular to said central axis, and (2) consecutively in said flow direction have respectively increasing areas.

6. The flow rate sensor according to claim 5, wherein said converged section and said enlarged section are shaped such that said main fluid passage is geometrically symmetrical about a transverse axis interposed between said converged section and said enlarge section.

7. The flow rate sensor according to claim 5, wherein an inner surface of said enlarged section is a scabrous surface.

8. The flow rate sensor according to claim 7, wherein a plurality of projections are formed on said inner surface of said enlarged section.

9. The flow rate sensor according to claim 8, wherein an m/r ratio is set in a range of about 25 to about 40;

wherein m is a fluid average depth defined as a ratio of (a passage cross sectional area of said main fluid passage corresponding to a narrowest portion thereof)/(a circumferential length of a passage cross section of said main fluid passage corresponding to said narrowest portion thereof); and wherein r is a maximum height of said projections formed on said inner surface of said enlarged section adjacent to said narrowest portion of said main fluid passage.

10. The flow rate sensor according to claim 7, wherein said inner surface of said enlarged section has a stepped shape.

11. The flow rate sensor according to claim 10, wherein an m/r ratio is set in a range of about 25 to about 40;

wherein m is a fluid average depth defined as a ratio of (a passage cross sectional area of said main fluid passage corresponding to a narrowest portion thereof)/(a circumferential length of a passage cross section of said main fluid passage corresponding to said narrowest portion thereof); and wherein r is a maximum height of steps of said stepped shaped inner surface of said enlarged section adjacent to said narrowest portion of said main fluid passage.

12. The flow rate sensor according to claim 5, wherein said inner surface of said converged section is continuously and integrally connected with an inner surface of said enlarged section.

13. The flow rate sensor according to claim 2, wherein a plurality of projections are formed on said inner surface of said converged section adjacent to a narrowest portion of said converged section.

14. The flow rate sensor according to claim 13, wherein said projections are elongate sharp members arranged circumferentially at an equal interval on said inner surface of said converged section, longitudinal axes of said elongate sharp members extending is said fluid direction, each elongate sharp member having a triangular cross section and a height that gradually increases in said flow direction.

15. The flow rate sensor according to claim 13, wherein an m/r ratio is set in a range of about 25 to about 40;

wherein m is a fluid average depth defined as a ratio of (a passage cross sectional area of said main fluid passage corresponding to a narrowest portion thereof)/(a circumferential length of a passage cross section of said main fluid passage corresponding to said narrowest portion thereof); and wherein r is a maximum height of said projections formed on said inner surface of said converged section adjacent to said narrowest portion of said main fluid passage.

16. The flow rate sensor according to claim 2, further comprising:

a fluid rectifying grate provided on an upstream end portion of said converged section.

17. A flow rate sensor comprising:

a main fluid passage for accommodating a fluid flow that travels in a flow direction from an upstream end of said main fluid passage to a downstream end of said main fluid passage said main fluid passage having a central axis;

a detecting pipe conduit coaxially disposed in said main fluid passage;

a temperature sensing element provided in said main fluid passage for sensing a fluid flow temperature;

a flow rate detecting element including a flow rate detecting resistance made of a thermo-sensitive electrically resistant material, said flow rate detecting element disposed in said detecting pipe conduit and exposed to said fluid flow; and a control circuit for controlling an electric current flowing to said flow rate detecting resistance such that a temperature of said flow rate detecting resistance is maintained higher than said fluid flow temperature detected by said temperature sensing element;

a flow rate of said fluid flow through said main fluid passage measured via a heat transfer phenomenon from said flow rate detecting resistance to said fluid flow;

wherein said detecting pipe conduit includes a converged section in which transverse cross sections taken (1) perpendicular to said central axis and (2) consecutively in said flow direction have respectively decreasing areas;

wherein an inner surface of said converged section has a curved profile in a longitudinal cross section taken parallel to said central axis.

* * * * *